(12) United States Patent
An et al.

(10) Patent No.: US 11,126,768 B2
(45) Date of Patent: Sep. 21, 2021

(54) METHODS OF DESIGNING SEMICONDUCTOR DEVICES, DESIGN SYSTEMS PERFORMING THE SAME AND METHODS OF MANUFACTURING SEMICONDUCTOR DEVICES USING THE SAME

(71) Applicant: Samsung Electronics Co., Ltd., Suwon-si (KR)

(72) Inventors: Jungsu An, Hwaseong-si (KR); Daehyung Myung, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/032,605

(22) Filed: Sep. 25, 2020

(65) Prior Publication Data

US 2021/0264081 A1 Aug. 26, 2021

(30) Foreign Application Priority Data

Feb. 24, 2020 (KR) .................. 10-2020-0022054

(51) Int. Cl.
*G06F 30/31* (2020.01)
*G06F 30/396* (2020.01)
*G06F 30/392* (2020.01)
*G06F 111/02* (2020.01)

(52) U.S. Cl.
CPC ............ *G06F 30/31* (2020.01); *G06F 30/392* (2020.01); *G06F 30/396* (2020.01); *G06F 2111/02* (2020.01)

(58) Field of Classification Search
USPC ....................................................... 716/102
See application file for complete search history.

(56) References Cited

U.S. PATENT DOCUMENTS

| 6,198,980 | B1 | 3/2001 | Costanza |
| 6,263,483 | B1 | 7/2001 | Dupenloup |
| 6,421,818 | B1 | 7/2002 | Dupenloup et al. |
| 7,669,157 | B1 | 2/2010 | Borer et al. |
| 7,865,856 | B1 | 1/2011 | Kahng et al. |
| 8,694,940 | B2 | 4/2014 | Griesbach et al. |
| 8,806,406 | B2 | 8/2014 | Chandramohan et al. |
| 8,938,703 | B1 | 1/2015 | Saurabh et al. |
| 2006/0294491 | A1* | 12/2006 | Becker ............... G06F 30/327 716/104 |

(Continued)

*Primary Examiner* — Mohammed Alam
(74) *Attorney, Agent, or Firm* — Myers Bigel, P.A.

(57) ABSTRACT

In a method of designing a semiconductor device, a first sub-block included in the semiconductor device is designed by a first EDA tool. A second sub-block included in the semiconductor device is designed by a second EDA tool different from the first EDA tool. A first sub-block model corresponding to the first sub-block and a second sub-block model corresponding to the second sub-block are generated by transforming logical information and physical information associated with one of a result of designing the first sub-block or a result of designing the second sub-block. The first and the second sub-block model have a same format. An integrated physical design for the semiconductor device is obtained by combining the first and the second sub-block based on the first and the second sub-block model. The first and the second EDA tool are configured to design different physical structures for a same logical block.

20 Claims, 23 Drawing Sheets

(56) References Cited

U.S. PATENT DOCUMENTS

| | | | |
|---|---|---|---|
| 2015/0287449 A1* | 10/2015 | Kim | G11C 11/1675 365/158 |
| 2018/0157161 A1* | 6/2018 | Mailfert | G06F 30/367 |
| 2018/0189952 A1* | 7/2018 | Zhang | G06F 30/39 |
| 2020/0175122 A1* | 6/2020 | Nam | G06F 30/392 |

* cited by examiner

METHODS OF DESIGNING SEMICONDUCTOR DEVICES, DESIGN SYSTEMS PERFORMING THE SAME AND METHODS OF MANUFACTURING SEMICONDUCTOR DEVICES USING THE SAME

CROSS-REFERENCE TO RELATED APPLICATION

This application claims priority under 35 USC § 119 to Korean Patent Application No. 10-2020-0022054, filed on Feb. 24, 2020, in the Korean Intellectual Property Office (KIPO), the contents of which are herein incorporated by reference in their entirety.

BACKGROUND

1. Technical Field

Example embodiments of the present disclosure relate generally to semiconductor integrated circuits, and more particularly to methods of designing semiconductor devices, design systems performing the methods of designing the semiconductor devices, and methods of manufacturing semiconductor devices using the methods of designing the semiconductor devices.

2. Description of the Related Art

A semiconductor device may be manufactured by patterning devices and mutual connections thereof on a substrate such as a semiconductor wafer. A semiconductor device may be manufactured through a process in which a designer designs an integrated circuit using an electronic design automation (EDA) tool, which enables various circuit components to be placed to interact with each other and to be connected to each other. In other words, a layout designer may generate a layout and physical design of a semiconductor device using the EDA tool.

The layout and physical design of the semiconductor device may include physical locations and sizes of circuit components, connection wires and various layers. The layout and physical design of the semiconductor device may be verified and transferred to a semiconductor substrate, and thus the semiconductor device may be manufactured. In other words, a physical chip may be implemented later according to (e.g., using) the designed layout and physical design.

SUMMARY

At least one example embodiment of the present disclosure provides a method of designing a semiconductor device that is capable of efficiently establishing a mixed flow for one design.

At least one example embodiment of the present disclosure provides a design system using the method of designing the semiconductor device that is capable of efficiently establishing a mixed flow for one design At least one example embodiment of the present disclosure provides a method of manufacturing a semiconductor device using the method of designing the semiconductor device.

According to example embodiments of the present disclosure, in a method of designing a semiconductor device, a first sub-block included in the semiconductor device is designed by a first electronic design automation (EDA) tool. A second sub-block included in the semiconductor device is designed by a second EDA tool different from the first EDA tool. A first sub-block model corresponding to the first sub-block and a second sub-block model corresponding to the second sub-block are generated by transforming logical information and physical information associated with one of a result of designing the first sub-block or a result of designing the second sub-block. The first sub-block model and the second sub-block model have a same format. An integrated physical design for the semiconductor device is obtained by combining the first sub-block and the second sub-block based on the first sub-block model and the second sub-block model. The first EDA tool and the second EDA tool are configured to design different physical structures for a same logical block.

According to example embodiments of the present disclosure, a design system includes a first electronic design automation (EDA) tool and a second EDA tool. The first EDA tool designs a first sub-block included in a semiconductor device. The second EDA tool designs a second sub-block included in the semiconductor device, and is different from the first EDA tool. The first EDA tool and the second EDA tool are further configured to design different physical structures for a same logical block. A first sub-block model corresponding to the first sub-block and a second sub-block model corresponding to the second sub-block are generated by transforming logical information and physical information associated with one of a result of designing the first sub-block or a result of designing the second sub-block. The first sub-block model and the second sub-block model have a same format. An integrated physical design for the semiconductor device is obtained by combining the first sub-block and the second sub-block based on the first sub-block model and the second sub-block model.

According to example embodiments of the present disclosure, in a method of manufacturing a semiconductor device, a design of the semiconductor device is generated. The semiconductor device is fabricated based on the generated design of the semiconductor device. When generating the design of the semiconductor device, a first sub-block included in the semiconductor device is designed by a first electronic design automation (EDA) tool. A second sub-block included in the semiconductor device is designed by a second EDA tool different from the first EDA tool. A first sub-block model corresponding to the first sub-block and a second sub-block model corresponding to the second sub-block are generated by transforming logical information and physical information associated with one of a result of designing the first sub-block or a result of designing the second sub-block. The first sub-block model and the second sub-block model have a same format. An integrated physical design for the semiconductor device is obtained by combining the first sub-block and the second sub-block based on the first sub-block model and the second sub-block model. The first EDA tool and the second EDA tool are configured to design different physical structures for a same logical block.

According to example embodiments of the present disclosure, a method of designing a semiconductor device includes designing a first sub-block included in the semiconductor device, designing a second sub-block included in the semiconductor device, generating a first sub-block model corresponding to the first sub-block and a second sub-block model corresponding to the second sub-block by transforming logical information and physical information associated with one of a result of designing the first sub-block or a result of designing the second sub-block, the first sub-block model and the second sub-block model having a same format, and obtaining an integrated physical design for the semiconductor device by combining the first sub-block and the second sub-block based on the first sub-block model and the second sub-block model, where the first sub-block and the second sub-block are designed by different schemes In the method of designing the semiconductor device, the design system, and the method of manufacturing the semiconductor device according to example embodiments of the present disclosure, the sub-blocks included in one semiconductor device may be separately designed using different EDA tools and/or workstations, information associated with some of the designed sub-blocks may be transformed such that all of the sub-block models corresponding to all of the sub-blocks have the same format, the integrated physical design for the entirety of the semiconductor device may be obtained based on the generated sub-block models, and thus a mixed flow may be implemented for designing the semiconductor device. Accordingly, when designing a semiconductor device including a large number of sub-blocks, the restriction or limitation on the human resources may be reduced, and the physical implementation tools may be efficiently operated. As a result, the semiconductor device may be rapidly and efficiently designed.

BRIEF DESCRIPTION OF THE DRAWINGS

Illustrative, non-limiting example embodiments of the present disclosure will be more clearly understood from the following detailed description taken in conjunction with the accompanying drawings.

DETAILED DESCRIPTION

Figure 1:
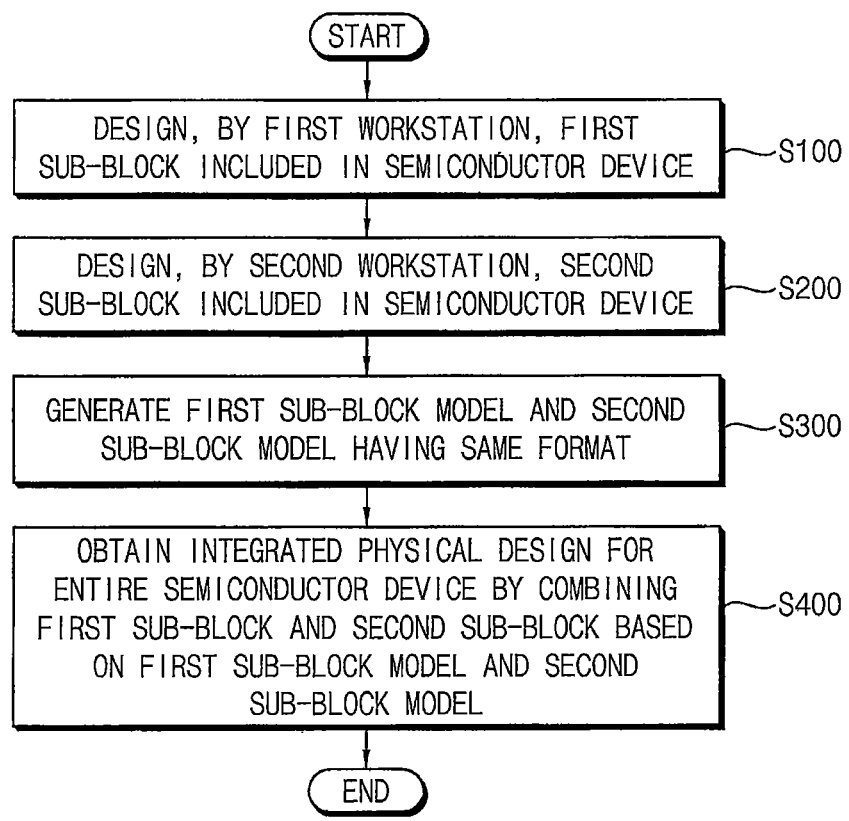
FIG. 1 is a flowchart illustrating a method of designing a semiconductor device according to example embodiments of the present disclosure.

Various example embodiments will be described more fully with reference to the accompanying drawings, in which embodiments of the present disclosure are shown. The present disclosure may, however, be embodied in many different forms and should not be construed as limited to the embodiments set forth herein. Like reference numerals refer to like elements throughout this application.

Figure 2:
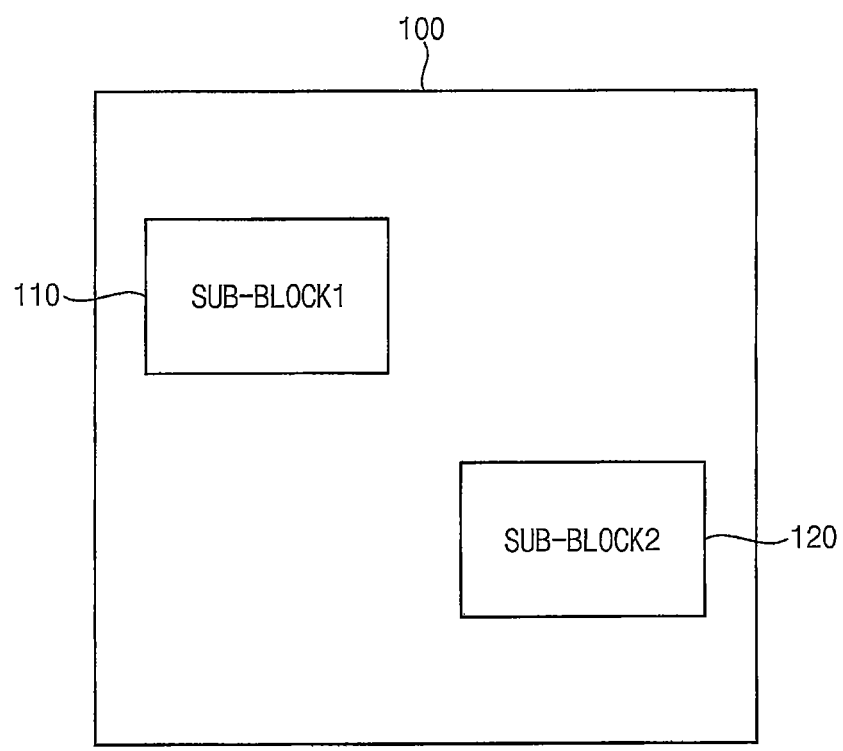
FIGS. 2, 3A, and 3B are diagrams for describing a method of designing a semiconductor device according to example embodiments of the present disclosure.
Figure 3A:
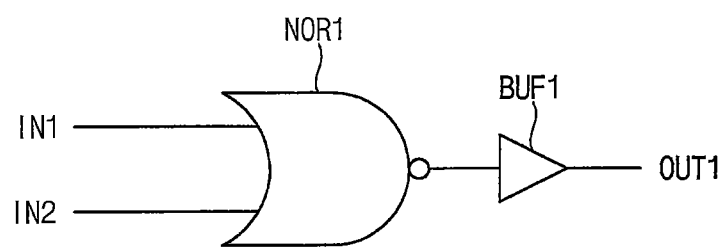
Figure 3B:
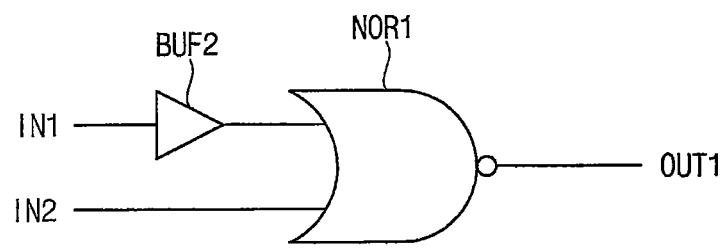

FIG. 1 is a flowchart illustrating a method of designing a semiconductor device according to example embodiments of the present disclosure. FIGS. 2, 3A, and 3B are diagrams for describing a method of designing a semiconductor device according to example embodiments of the present disclosure.

Referring to FIGS. 1, 2, 3A, and 3B, a method of designing a semiconductor device according to example embodiments is performed by a design system that includes two or more EDA tools and/or workstations different from each other. A configuration of the design system will be described with reference to FIGS. 4 and 5.

In the method of designing the semiconductor device according to example embodiments, a first sub-block included in the semiconductor device is designed by (or using) a first EDA tool and/or workstation (step S100), and a second sub-block included in the semiconductor device is designed by (or using) a second EDA tool and/or workstation different from the first EDA tool and/or workstation (step S200). For example, the first workstation may receive first input data for the first sub-block to perform step S100, and the second workstation may receive second input data for the second sub-block to perform step S200. Steps S100 and S200 will be described with reference to FIG. 7.

As illustrated in FIG. 2, a semiconductor device 100 includes a first sub-block 110 and a second sub-block 120 that are different from each other. As the semiconductor device 100 is highly integrated, it may be difficult to design the semiconductor device 100 as a whole at one time, and thus the semiconductor device 100 may be designed by dividing the semiconductor device 100 into a plurality of sub-blocks 110 and 120, by designing each of the sub-blocks 110 and 120, and by integrating the designed sub-blocks 110 and 120. When the plurality of sub-blocks 110 and 120 are divided according to their functions, the plurality of sub-blocks 110 and 120 may be referred to as a plurality of functional blocks.

Although FIG. 2 illustrates two sub-blocks 110 and 120 for convenience of illustration, example embodiments are not limited thereto, and the number of sub-blocks included in the semiconductor device 100 may be changed according to example embodiments.

The first workstation and the second workstation are different workstations, and the same logical block may be designed to have different physical structures by the first workstation and the second workstation. For example, FIGS. 3A and 3B illustrate the same logical block of a NOR gate NOR1 for generating an output OUT1 by performing a NOR operation on a first input IN1 and a second input IN2, and FIGS. 3A and 3B represent a case where the same logical block has different physical structures. An example of FIG. 3A may have a physical structure in which a buffer BUF1 is connected to an output terminal providing the output OUT1 of the NOR gate NOR1, and an example of FIG. 3B may have a physical structure in which a buffer BUF2 is connected to a first input terminal receiving the first input IN1 of the NOR gate NOR1. For example, the first workstation may be implemented to design the structure of FIG. 3A and the second workstation may be implemented to design the structure of FIG. 3B, however, example embodiments are not limited thereto.

In some example embodiments, to design the same logical block to have the different physical structures as described above, the first workstation and the second workstation may include different electronic design automation (EDA) tools.

A first sub-block model corresponding to the first sub-block and a second sub-block model corresponding to the second sub-block may be generated by transforming or converting logical information and physical information associated with one of a result of designing the first sub-block and/or a result of designing the second sub-block (step S300). The first sub-block model and the second sub-block model may have the same format. For example, the first and second sub-block models having the same format may be generated by transforming first logical information and first physical information associated with the result of designing the first sub-block, or by transforming second logical information and second physical information associated with the result of designing the second sub-block. Step S300 will be described with reference to FIGS. 9 and 12.

In some example embodiments, as will be described with reference to FIG. 11, step S300 may be performed after steps S100 and S200 are completed. In other example embodiments, as will be described with reference to FIG. 20, step S300 may be performed while step S100 is performed and/or while step S200 is performed.

An integrated physical design for the entire semiconductor device 100 may be obtained by combining or merging the first sub-block and the second sub-block based on the first sub-block model and the second sub-block model (step S400). The integrated physical design may be obtained by a single workstation.

In the method of designing the semiconductor device according to example embodiments, the sub-blocks included in one semiconductor device may be separately designed using different workstations, information associated with some of the designed sub-blocks may be transformed such that all of the sub-block models corresponding to all of the sub-blocks have the same format, the integrated physical design for the entire semiconductor device may be obtained based on the generated sub-block models, and thus a mixed flow may be implemented for designing the semiconductor device. Accordingly, when designing a semiconductor device including a large number of sub-blocks, the restriction or limitation on the human resources may be reduced, and the physical implementation tools may be efficiently operated. As a result, the semiconductor device may be rapidly and efficiently designed. The methods of designing the semiconductor device according to example embodiments may provide a technological improvement to semiconductor design systems. Example embodiments of the present disclosure may provide a means by which different EDA tools incorporating different formats may be used in a mixed flow, which may allow for the technical benefits of a first EDA tool (e.g., a faster design time) to be integrated with the technical benefits of a second EDA tool (e.g., improved timing). By incorporating different types of tools, the methods and design systems according to the present disclosure may provide a technical improvement that benefits from the improved characteristics of each of the tools, rather than those of just a single tool.

Figure 4:
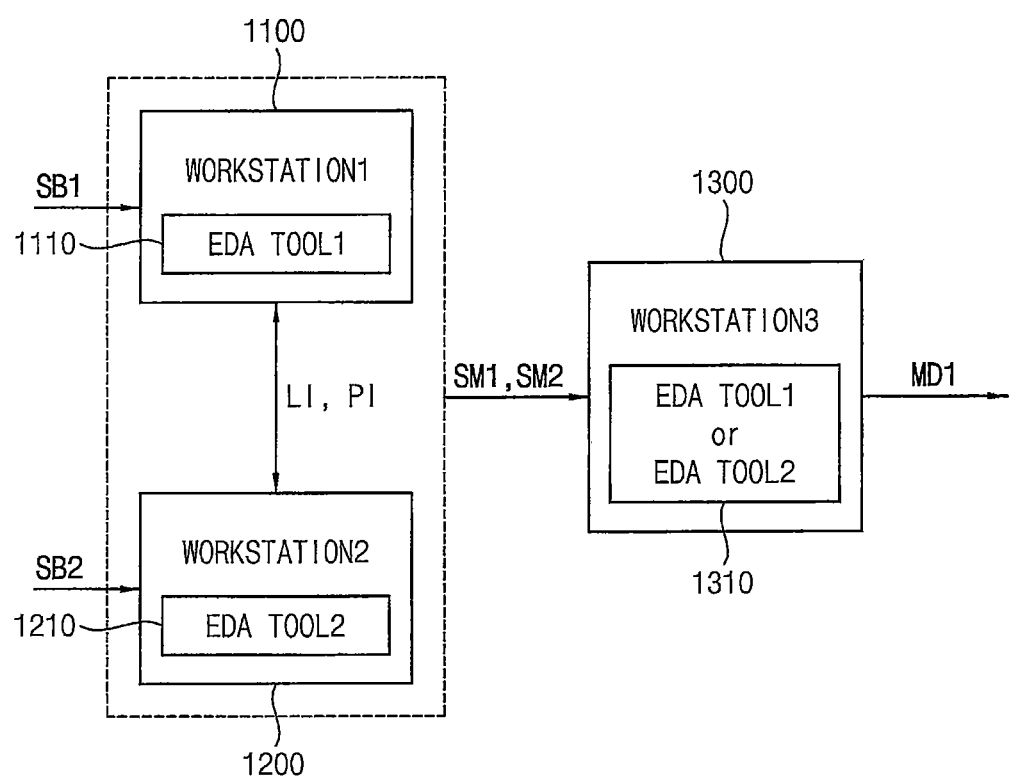
FIGS. 4 and 5 are block diagrams illustrating a design system for a semiconductor device according to example embodiments of the present disclosure.
Figure 5:
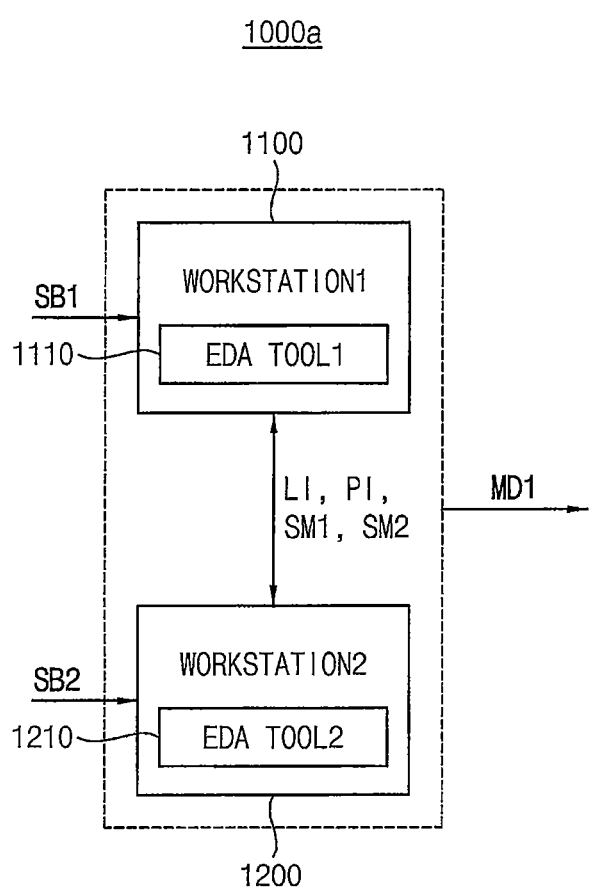

FIGS. 4 and 5 are block diagrams illustrating a design system for a semiconductor device according to example embodiments of the present disclosure.

Referring to FIGS. 2 and 4, a design system 1000 includes a first workstation 1100, a second workstation 1200, and a third workstation 1300.

The first workstation 1100 receives first input data SB1 for the first sub-block 110 included in the semiconductor device 100 and designs the first sub-block 110 based on the first input data SB1. In other words, the first workstation 1100 may perform step S100 in FIG. 1. The first workstation 1100 may include and/or use a first EDA tool 1110 for designing the first sub-block 110.

In some example embodiments, the first EDA tool 1110 may be an INNOVUS tool from Cadence Design Systems, Inc., and a sub-block model generated by the first EDA tool 1110 may be an interface logic model (ILM). The INNOVUS tool may have an advantage of being relatively fast in designing. However, example embodiments are not limited thereto, and the first EDA tool 1110 may be one of various other EDA tools.

The second workstation 1200 is different from the first workstation 1100, receives second input data SB2 for the second sub-block 120 included in the semiconductor device 100, and designs the second sub-block 120 based on the second input data SB2. In other words, the second workstation 1200 may perform step S200 in FIG. 1. The second workstation 1200 may include and/or use a second EDA tool 1210 for designing the second sub-block 120. The second EDA tool 1210 may be a different type of tool from the first EDA tool 1110.

In some example embodiments, the second EDA tool 1210 may be an integrated circuit (IC) compiler II (ICC2) tool from Synopsys, Inc., and a sub-block model generated by the second EDA tool 1210 may be a block abstraction model (ABS). The ICC2 tool may have an advantage of having relatively high timing optimization efficiency. However, example embodiments are not limited thereto, and the second EDA tool 1210 may be one of various other EDA tools different from the first EDA tool 1110.

In some example embodiments, each of the first input data SB1 received by the first workstation 1100 to design the first sub-block 110 and the second input data SB2 received by the second workstation 1200 to design the second sub-block 120 may be data generated from an abstract form with respect to behavior of a respective one of the first sub-block 110 and/or the second sub-block 120. For example, each input data may be defined in a register transfer level (RTL) through synthesis using a standard cell library. For example, each input data may be a bitstream or a netlist that is generated by synthesizing the sub-block defined by a hardware description language (HDL) such as VHSIC hardware description language (VHDL) or Verilog.

The first workstation 1100 and the second workstation 1200 may exchange logical information LI and physical information PI associated with design results. For example, the first workstation 1100 may provide first logical information and first physical information associated with a result of designing the first sub-block 110 to the second workstation 1200, and the second workstation 1200 may provide second logical information and second physical information associated with a result of designing the second sub-block 120 to the first workstation 1100.

The first workstation 1100 or the second workstation 1200 may transform the logical information LI and the physical information PI received from the other of the first workstation 1100 and the second workstation 1200, and generates a first sub-block model SM1 and a second sub-block model SM2, which are models having the same format and are suitable or appropriate for itself. The first sub-block model. SM1 may correspond to the first sub-block 110, and the second sub-block model SM2 may correspond to the second sub-block 120.

The third workstation 1300 is different from the first workstation 1100 and the second workstation 1200, combines the first sub-block 110 and the second sub-block 120 based on the first sub-block model SM1 and the second sub-block model SM2, and obtains an integrated physical design MD1 for the entire semiconductor device 100. In other words, the third workstation 1300 may perform step S400 in FIG. 1. The third workstation 1300 may include and/or use an EDA tool 1310 for obtaining the integrated physical design MD1.

In some example embodiments, the same logical block may be designed to have the same physical structure by the first workstation 1100 and the third workstation 1300. In other words, the first workstation 1100 and the third workstation 1300 may be workstations of the same type. For example, the first EDA tool 1110 included in the first workstation 1100 and the EDA tool 1310 included in the third workstation 1300 may be EDA tools of the same type.

When the first workstation 1100 and the third workstation 1300 are the workstations of the same type and/or use EDA tools of the same type, both of the first sub-block model SM1 and the second sub-block model SM2 may be generated by the first workstation 1100 and may be models suitable for the first workstation 1100. For example, the first workstation 1100 may generate the first sub-block model SM1 based on the result of designing the first sub-block 110 without any additional transformation process, and may generate the second sub-block model SM2 by transforming the second logical information and the second physical information associated with the result of designing the second sub-block 120. In this example, the first workstation 1100 may perform step S300 in FIG. 1.

In other example embodiments, the same logical block may be designed to have the same physical structure by the second workstation 1200 and the third workstation 1300. In other words, the second workstation 1200 and the third workstation 1300 may be workstations of the same type. For example, the second EDA tool 1210 included in the second workstation 1200 and the EDA tool 1310 included in the third workstation 1300 may be EDA tools of the same type.

When the second workstation 1200 and the third workstation 1300 are the workstations of the same type and/or use EDA tools of the same type, both of the first sub-block model SM1 and the second sub-block model SM2 may be generated by the second workstation 1200 and may be models suitable for the second workstation 1200. For example, the second workstation 1200 may generate the second sub-block model SM2 based on the result of designing the second sub-block 120 without any additional transformation process, and may generate the first sub-block model SM1 by transforming the first logical information and the first physical information associated with the result of designing the first sub-block 110. In this example, the second workstation 1200 may perform step S300 in FIG. 1.

As described above, an element that generates the first sub-block model SM1 and the second sub-block model SM2 may be changed to the first workstation 1100 or the second workstation 1200 depending on the type of the third workstation 1300 (e.g., the type of the EDA tool 1310)

Referring to FIGS. 2 and 5, a design system 1000*a* may include a first workstation 1100 and a second workstation 1200.

The design system 1000*a* may be substantially the same as the design system 1000 of FIG. 4, except that the third workstation 1300 is omitted and the first workstation 1100 or the second workstation 1200 performs the role of the third workstation 1300. The descriptions repeated with FIG. 4 will be omitted.

In some example embodiments, both of the first sub-block model SM1 and the second sub-block model SM2 may be generated by the first workstation 1100 and may be models suitable for the first workstation 1100. In this example, the first workstation 1100 may combine the first sub-block 110 and the second sub-block 120 based on the first sub-block model SM1 and the second sub-block model SM2, and may obtain the integrated physical design MD1 for the entire semiconductor device 100. In other words, the first workstation 1100 may perform both steps S300 and S400 in FIG. 1.

In other example embodiments, both of the first sub-block model SM1 and the second sub-block model SM2 may be generated by the second workstation 1200 and may be models suitable for the second workstation 1200. In this example, the second workstation 1200 may combine the first sub-block 110 and the second sub-block 120 based on the first sub-block model SM1 and the second sub-block model SM2, and may obtain the integrated physical design MD1 for the entire semiconductor device 100. In other words, the second workstation 1200 may perform both steps S300 and S400 in FIG. 1.

In the design systems 1000 and 1000*a* according to example embodiments, the first sub-block 110 and the second sub-block 120 may be designed by the first workstation 1100 and the second workstation 1200, respectively, and the first sub-block model SM1 and the second sub-block model SM2 may be generated only by the first workstation 1100 or the second workstation 1200. In addition, the operation of obtaining the integrated physical design MD1 for the entire semiconductor device 100 by combining the first sub-block 110 and the second sub-block 120 may also be performed only by one workstation (e.g., by the third workstation 1300 in the example of FIG. 4 and by the first workstation 1100 or the second workstation 1200 in the example of FIG. 5).

Figure 6:
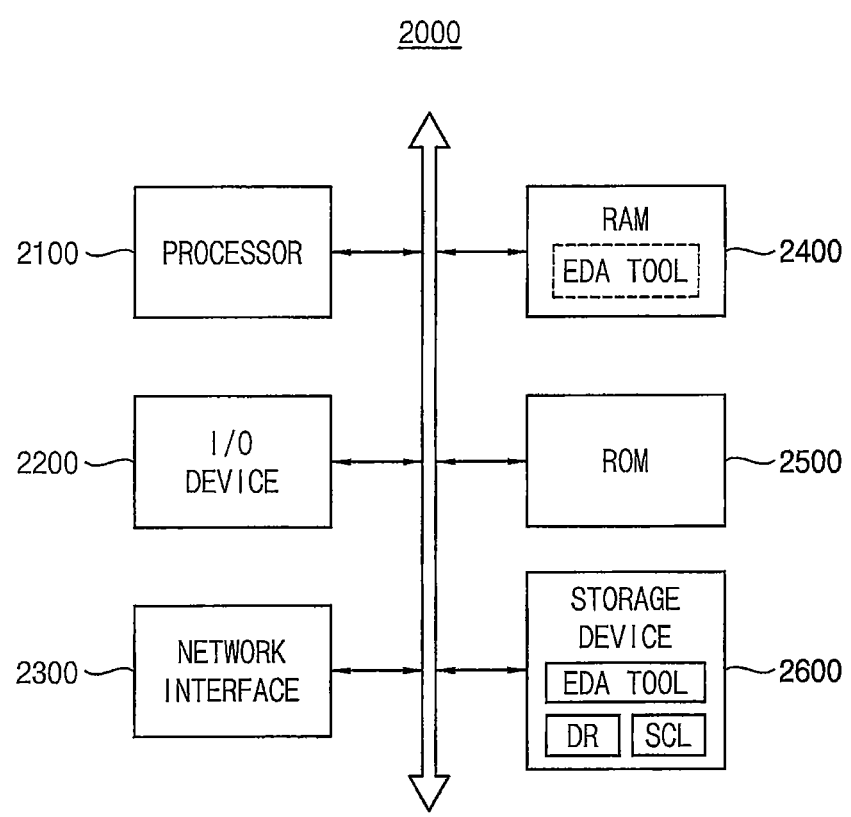
FIG. 6 is a block diagram illustrating an example of a workstation included in a design system for a semiconductor device according to example embodiments of the present disclosure.

FIG. 6 is a block diagram illustrating an example of a workstation included in a design system for a semiconductor device according to example embodiments of the present disclosure.

Referring to FIG. 6, a workstation 2000 includes a processor 2100, an input/output (I/O) device 2200, a network interface 2300, a random access memory (RAM) 2400, a read only memory (ROM) 2500, and a storage device 2600.

The workstation 2000 may be a computing system. For example, the computing system may be a fixed computing system such as a desktop computer and a server, or may be a portable computing system such as a laptop computer. The workstation 2000 may use hardware, software implemented with hardware, firmware, tangible computer-readable storage media having instructions stored thereon and/or a combination thereof, and may be implemented in one or more computer systems or other processing systems. The workstation 2000 may also utilize a virtual instance of a computer. As such, the devices and methods described herein may be embodied in any combination of hardware and software.

The processor 2100 may include a core or a processor core for executing an arbitrary instruction set (for example, Intel architecture-32 (IA-32), 64 bit extension IA-32, x86-64, PowerPC, Sparc, MIPS, ARM, IA-64, etc.). For example, the processor 2100 may access a memory (e.g., the RAM 2400 and/or the ROM 2500) through a bus, and may execute instructions stored in the RAM 2400 and/or the ROM 2500. In some embodiments, the processor 2100 may be a virtual processor of a virtual instance of a computer. As illustrated in FIG. 6, the RAM 2400 may store a program corresponding to the EDA tools included in the workstations of FIGS. 4 and 5 or at least some elements of the program, and the program may allow the processor 2100 to perform an operation of designing a semiconductor device.

In other words, the program corresponding to the EDA tools may include a plurality of instructions and/or procedures executable by the processor 2100, and the plurality of instructions and/or procedures included in the program may allow the processor 2100 to perform the method of designing the semiconductor device according to example embodiments. Each of the procedures may denote a series of instructions for performing a certain task. A procedure may be referred to as a function, a routine, a subroutine, or a subprogram. Each of the procedures may process data provided from the outside and/or data generated by another procedure.

In some example embodiments, the RAM 2400 may include a volatile memory such as a dynamic random access memory (DRAM), a static random access memory (SRAM), or the like The storage device 2600 may store the program corresponding to the EDA tools, and may store a standard cell library SCL and a design rule DR. The program, or at least some elements of the program, may be loaded from the storage device 2600 to the RAM 2400 before being executed by the processor 2100. The storage device 2600 may store a file written in a program language, and the program generated by a compiler or the like, or at least some elements of the program, may be loaded to the RAM 2400.

The storage device 2600 may store data, which is to be processed by the processor 2100, or data obtained through processing by the processor 2100. The processor 2100 may process the data stored in the storage device 2600 to generate new data, based on the program and may store the generated data in the storage device 2600.

In some example embodiments, the storage device 2600 may be a solid state drive (SSD). In other example embodiments, the storage device 2600 may be include a universal flash storage (UFS), a multimedia card (MMC), an embedded multimedia card (eMMC), a secure digital (SD) card, a micro SD card, a memory stick, a chip card, a universal serial bus (USB) card, a smart card, a compact flash (CF) card, and/or the like.

The I/O device 2200 may include an input device, such as a keyboard, a pointing device, or the like, and may include an output device such as a display device, a printer, or the like. For example, a user may trigger, through the I/O devices 2200, execution of the program by the processor 2100 or may input the input data such as the first and second input data SB1 and SB2 in FIGS. 4 and 5, and may check the output data such as the integrated physical design MD1 in FIGS. 4 and 5, an error message, and/or the like.

The network interface 2300 may provide access to a network outside the workstation 2000. For example, the network may include a plurality of computing systems and communication links, and the communication links may include wired links, optical links, wireless links, and/or arbitrary other type links. The input data may be provided to the workstation 2000 through the network interface 2300, and the output data may be provided to another computing system through the network interface 2300.

Figure 7:
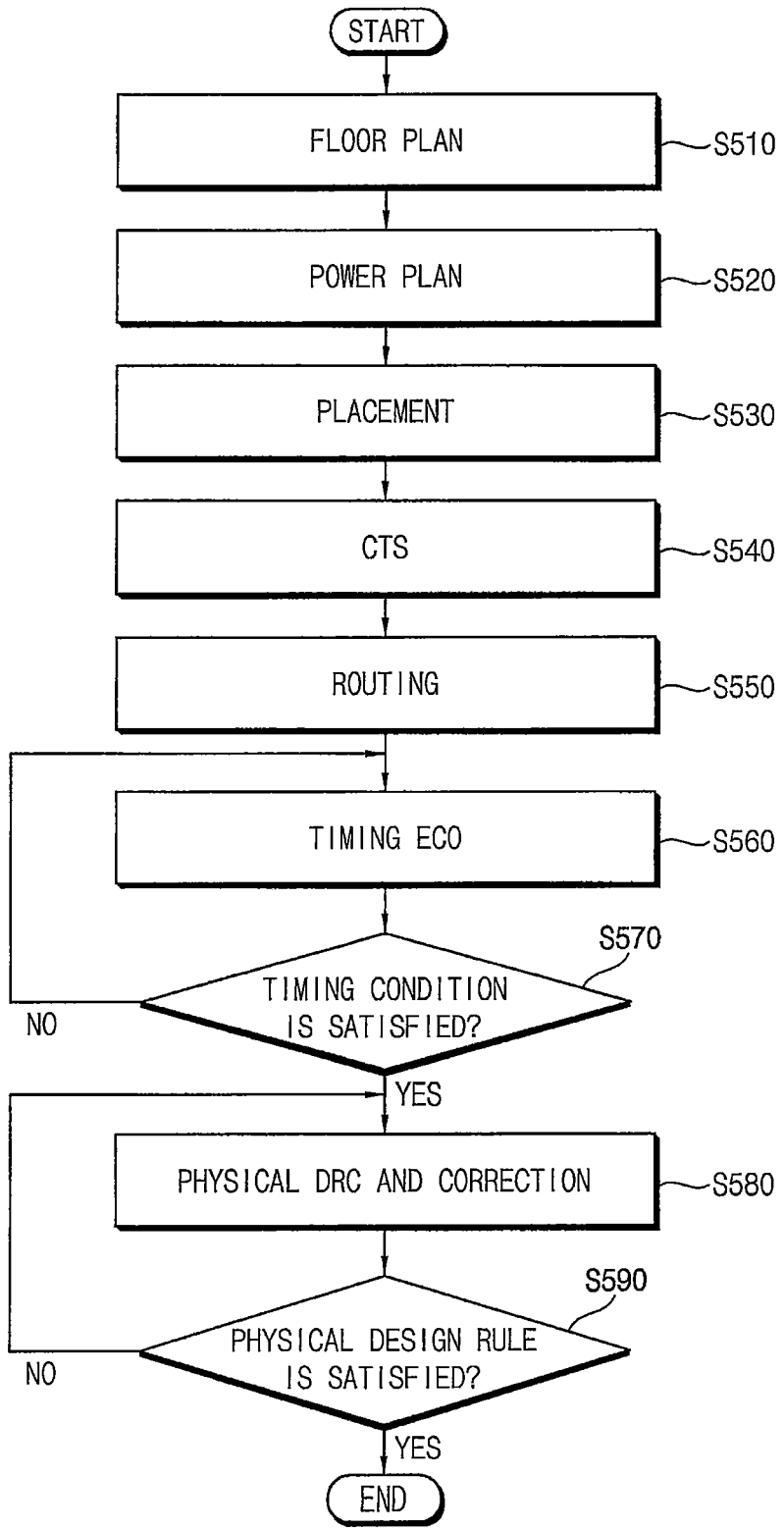
FIG. 7 is a flowchart illustrating an example of designing a sub-block in FIG. 1.

FIG. 7 is a flowchart illustrating an example of designing a sub-block in FIG. 1.

Referring to FIGS. 1 and 7, when designing the first sub-block (step S100), or when designing the second sub-block (step S200), a floor plan may be performed first (step S510). The floor plan may include schematic placement information of gates in a sub-block included in a semiconductor device. In other words, the floor plan may represent an operation of cutting and shifting a logically designed schematic circuit and then physically designing the circuit, that is, an operation of generating a layout pattern of memory or functional blocks for actual fabrication.

After that, a power plan may be performed (step S520). The power plan may include schematic routing information of a power grid for supplying power to the gates. In other words, the power plan may represent an operation of generating a layout pattern of wires (e.g., a wiring layout pattern) for connecting local power (e.g., a driving voltage) or a ground to the arranged functional blocks. For example, a wiring layout pattern for connecting power or a ground may be generated in the form of a mesh such that the power is uniformly supplied to the entire chip. In this regard, all patterns may be provided in the form of a mesh based on various rules.

After that, a placement may be performed on elements included in the sub-block (step S530). The placement may include an operation of determining where to place the gates in the sub-block. In other words, the placement may represent an operation of generating a placement pattern of elements constituting each functional block.

After that, a clock tree synthesis (CTS) may be performed on a clock signal provided to the elements (step S540). The CTS may represent an operation of generating a layout pattern of signal lines for a central clock related to a response time for determining the performance of the semiconductor device.

After that, a routing may be performed on a normal (or general) signal provided to the elements (step S550). The routing may include an operation of determining how to route wires connecting the gates in the sub-block. In other words, the routing may represent an operation of generating a layout pattern of normal signal lines. The term "normal signal lines" may denote signal lines for transmitting normal control signals, input signals, or output signals, rather than clock signal lines.

After that, a result of the placement performed in step S530, a result of the CTS performed in step S540, and a result of the routing performed in step S550 may be verified.

When verifying, a timing engineering change order (ECO) process may be performed first (step S560). For example, the timing ECO process may include a static timing analysis (STA) operation and a timing update operation. For example, the timing ECO process may include a timing optimization operation.

After that, it may be checked whether a predetermined timing condition is satisfied (step S570). For example, step S570 may include an operation of determining whether a timing violation occurs. For example, whether a setup timing violation or a hold timing violation of a flip-flop occurs may be determined.

If the predetermined timing condition is not satisfied (step S570: NO), steps S560 and S570 may be repeated. For example, to solve or improve the timing violation detected in operation S570 through the timing ECO process, cells and power lines in the semiconductor device may be appropriately placed and routed. Also, in the timing ECO process, a cell size or location may be adjusted, a buffer may be inserted, or the lengths or widths of power lines in the integrated circuit may be adjusted.

If the predetermined timing condition is satisfied (step S570: YES), a predetermined physical design rule check (DRC) and correction may be performed (step S580). For example, step S580 may be performed based on the design rule DR stored in the storage device 2600 in FIG. 6.

After that, it may be checked whether the physical design rule is satisfied (step S590). If the physical design rule is not satisfied (step S590: NO), steps S580 and S590 may be repeated. If the physical design rule is satisfied (step S590: YES), the operation of designing the sub-block may be completed.

Figure 8A:
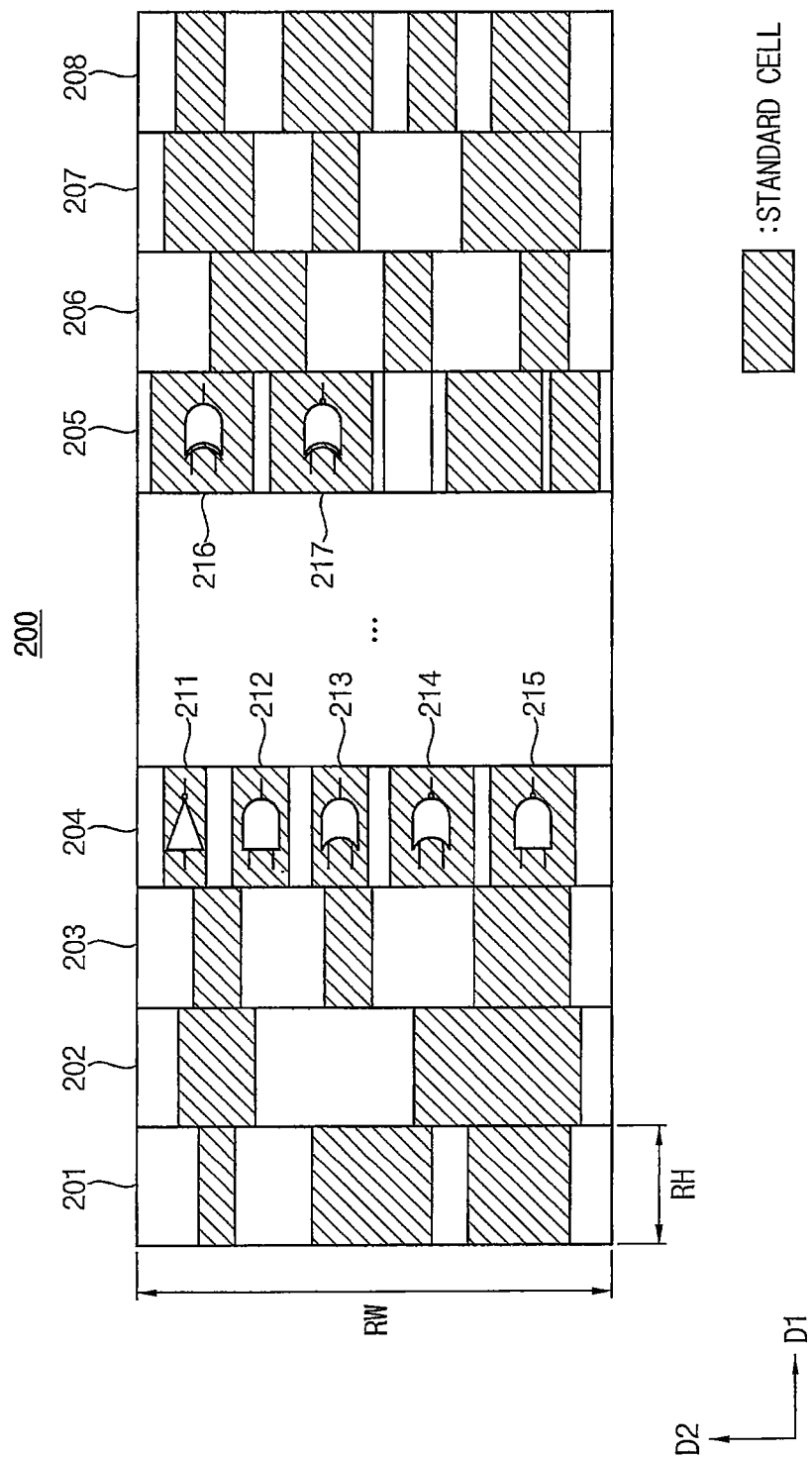
FIGS. 8A, 8B, and 8C are diagrams for describing an operation of designing a sub-block of FIG. 7.
Figure 8B:
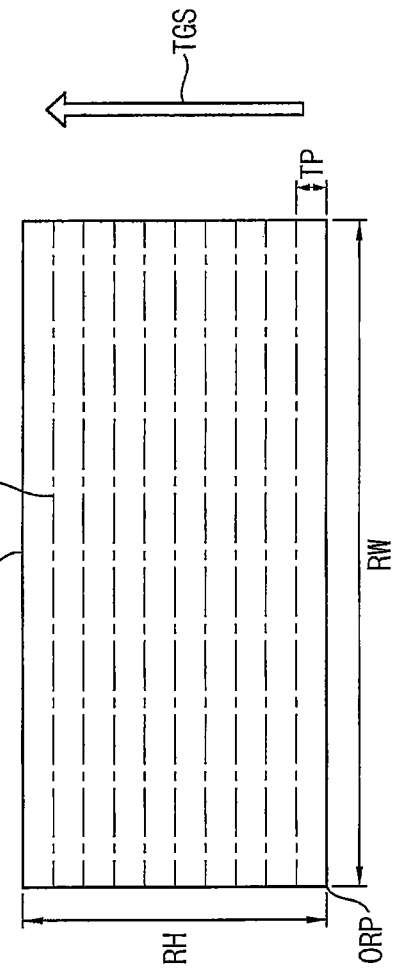
Figure 8B:
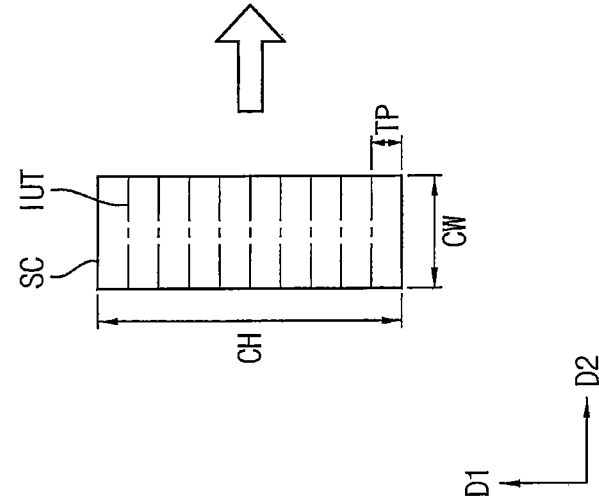
Figure 8C:
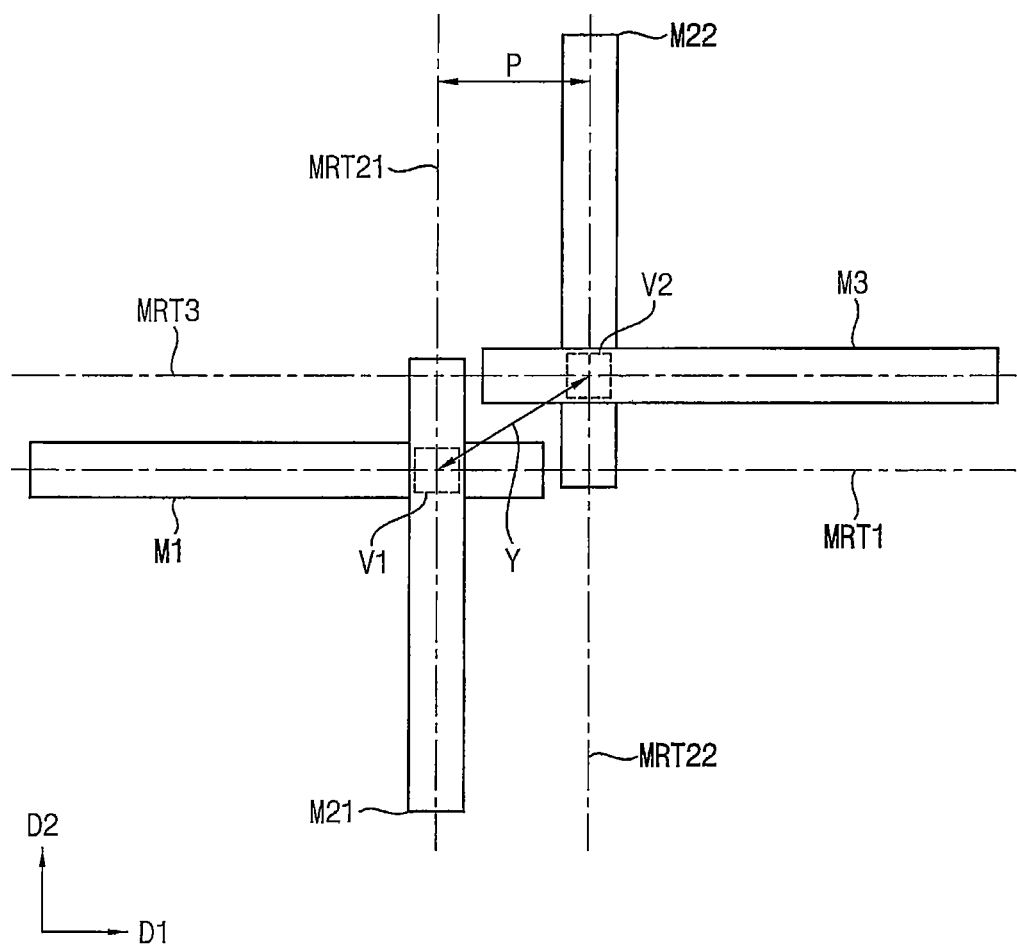

FIGS. 8A, 8B, and 8C are diagrams for describing an operation of designing a sub-block of FIG. 7.

Referring to FIG. 8A, an example of a sub-block 200 of a semiconductor device designed by the operation of FIG. 7 is illustrated.

The sub-block 200 may include a plurality of rows or site-rows 201, 202, 203, 204, 205, 206, 207, and 208, and a plurality of components represented by standard cells 211, 212, 213, 214, 215, 216, and 217.

The plurality of standard cells 211 to 217 may be generated based on a stored or input standard cell library (e.g., the standard cell library SCL in FIG. 6). In FIG. 8A, rectangles which are cross-hatched are the standard cells. The numbers of transistors of the various types of standard cells may differ from one another and so, the standard cells 211 to 217 may have different functions from one another. For example, the standard cell 211 may perform a function of an inverter. The standard cell 212 may perform an AND function. The standard cell 213 may perform an OR function. The standard cell 214 may perform a function of a NOR gate. The standard cell 215 may perform a function of a NAND gate. The standard cell 216 may perform a function of an XOR gate. The standard cell 217 may perform a function of an XNOR gate. Standard cells that perform other functions of various logical circuits may be generated. The standard cells 211 to 217 may have various sizes according to their respective function, however, all of the standard cells 211 to 217 may have the same unit height. In any case, various types of standard cells may be combined with one another to constitute a functional circuit or functional block.

The row or site-row may be a frame in which the standard cells are laid out in the schematic of the automatically designed sub-block 200. The plurality of rows 201 to 208 may be generated by an EDA tool. Each of the rows 201 to 208 may have a row height RH in a first direction D1 and may have a row width RW in a second direction D2. For example, the row height RH may be a unit height which is the same as that of each standard cell. The row width RW may be changed according to a function of the sub-block 200. The rows 201 to 208 may be generated in sequence from the row 201 to the row 208 along the first direction D1.

The number of rows 201 to 208 may be determined according to the function of the sub-block 200.

The standard cells may be laid out in the rows 201 to 208 according to a circuit configuration of the sub-block 200. For example, the standard cells may be disposed in the rows 201 to 208 and interconnections of the standard cells may be designed. Although not illustrated in FIG. 8A, the standard cells may be connected to one another by metal lines. The metal lines may be included in a plurality of layers. The layers may be stacked in a third direction perpendicular to the first direction D1 and the second direction D2. Metal lines of each layer may run in a direction perpendicular to metal lines of each layer adjacent thereto. For example, when metal lines of the lowermost first layer run in the first direction D1, metal lines of a second layer adjacent to the first layer may run in the second direction D2. For example, a unit height of the standard cell or the row may be determined based on the spacing of metal lines of the second layer running in the second direction D2.

Referring to FIG. 8B, an example of generating a standard cell and a row is illustrated.

An EDA tool may generate standard cells SC, may perform a floor plan based on sizes of the standard cells SC, and may design rows SR and metal routing tracks MRT for the rows SR. The metal routing tracks MRT may be virtual lines along which metal lines of the semiconductor device may be laid out and are to run to connect the standard cells (SC) in the rows SR.

In FIG. 8B, the standard cell SC having a cell height CH in the first direction D1 and a cell width CW in the second direction D2 may be generated. For example, all of the standard cells may have the same unit height as the cell height CH. However, each standard cell may have a variety of cell widths CW depending on the type.

The EDA tool may generate the standard cell SC having the unit height that is an integer multiple of the spacing of metal lines to be formed along the metal routing tracks MRT in the second direction D2. In other words, the cell height CH may be an integer multiple of the space between adjacent ones of the metal lines. The EDA tool may form internal unit tracks IUT in the standard cell SC at a track pitch TP corresponding to the spacing of the metal lines. Each of the internal unit tracks IUT may be a virtual line corresponding to the metal routing tracks MRT of the row SR. Contact points of transistors of the standard cell SC may exist on the internal unit tracks IUT.

The EDA tool may generate the row SR based on the unit height of the standard cell SC. In other words, the row height RH may be the unit height. The EDA tool may generate the metal routing tracks MRT at the track pitch TP from an origin point ORP in a direction of arrow TGS.

The unit height of the standard cell SC may be designed as an integer multiple of the space between the metal lines according to a standardized floor plan rule of the EDA tool regardless of the size of the NMOS/PMOS of the standard cell.

Referring to FIG. 8C, an example of metal routing tracks corresponding to virtual lines for the arrangement of metal lines is illustrated.

Metal routing tracks may be generated repeatedly in a design area of the sub-block according to a predetermined spacing value. For example, the metal routing tracks may be generated repeatedly at regular intervals from the bottom to the top of the physical design area. In some cases, even with metal routing tracks corresponding to the same layer, an interval between metal routing tracks may be a first interval in some areas, and an interval between metal routing tracks may be a second interval different from the first interval in other areas. In addition, the metal routing tracks may generally be generated to follow a certain preferred direction.

For example, physical information associated with the metal lines may include information of a first metal layer, a second metal layer, and a third metal layer formed at different levels, and may include information of a first via V1 and a second via V2 formed at different levels.

The first metal layer may be, for example, a layer on which metal M1 is disposed, and may be formed at a first level. A first metal routing track MRT1 may be a routing track for arranging the metal M1 of the first metal layer, and may be generated along a preferred direction of the first direction D1, for example.

The second metal layer may be, for example, a layer on which metals M21 and M22 are disposed, and may be formed at a second level higher than the first level. Second metal routing tracks MRT21 and MRT22 may be routing tracks for arranging the metals M21 and M22 of the second metal layer, and may be generated along a preferred direction of the second direction D2 perpendicular to the first direction D1, for example.

The third metal layer may be, for example, a layer on which metal M3 is disposed, and may be formed at a third level higher than the second level. A third metal routing track MRT3 may be a routing track for arranging the metal M3 of the third metal layer, and may be generated along a preferred direction of the first direction D1, for example.

Heights of the first, second, and third levels may represent heights in a third direction perpendicular to both the first direction D1 and the second direction D2.

The first via V1 may be formed on the first metal layer to connect the first metal layer with the second metal layer. For example, the first via V1 may be formed on the metal M1 of the first metal layer to provide an electrical connection with the metal M21 of the second metal layer.

The second via V2 may be formed on the second metal layer to connect the second metal layer with the third metal layer. For example, the second via V2 may be formed on the metal M22 of the second metal layer to provide an electrical connection with the metal M3 of the third metal layer.

In addition, the physical information associated with the metal lines may further include via spacing rule information Y between the first via V1 and the second via V2 and pitch information P of the second metal layer. The via spacing rule information Y may be information representing a design rule that defines how far apart the first via V1 and the second via V2 formed at different levels should be from each other. The pitch information P may be information representing a distance between the second metal routing tracks MRT21 and MRT22 repeatedly generated at regular intervals in the second metal layer. In other words, the pitch information P may represent a distance between center lines of the metals M21 and M22. The sub-block may be designed to satisfy the via spacing rule information Y and the pitch information P.

Figure 9:
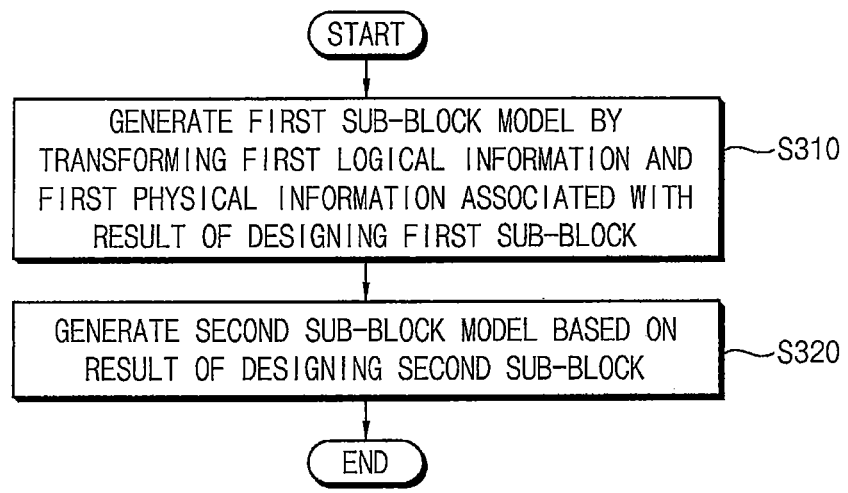
FIG. 9 is a flowchart illustrating an example of generating a first sub-block model and a second sub-block model in FIG. 1.

FIG. 9 is a flowchart illustrating an example of generating a first sub-block model and a second sub-block model in FIG. 1.

Referring to FIGS. 1 and 9, when generating the first sub-block model and the second sub-block model (step S300), the first sub-block model may be generated by transforming first logical information and first physical information associated with the result of designing the first sub-block (step S310), and the second sub-block model may be generated based on the result of designing the second sub-block (step S320). FIG. 9 illustrates an example where the first sub-block model and the second sub-block model are generated by the second workstation and are suitable for the second workstation.

Figure 10:
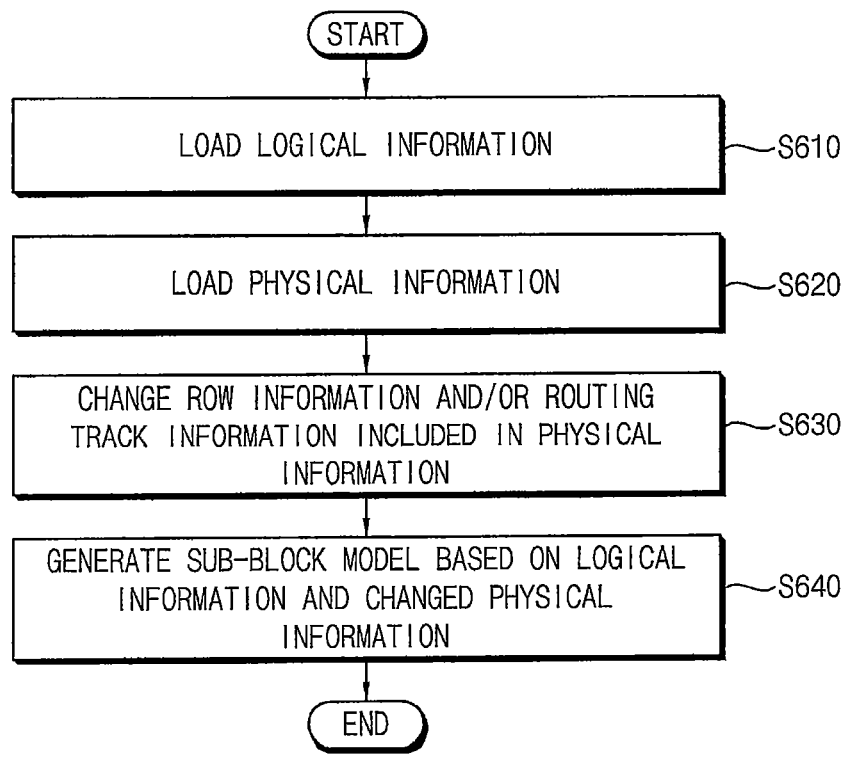
FIG. 10 is a flowchart illustrating an example of generating a first sub-block model in FIG. 9.

FIG. 10 is a flowchart illustrating an example of generating a first sub-block model in FIG. 9.

Referring to FIGS. 9 and 10, when generating the first sub-block model (step S310), the first logical information associated with the result of designing the first sub-block may be loaded (step S610), the first physical information associated with the result of designing the first sub-block may be loaded (step S620), row information and/or routing track information included in the first physical information may be changed (step S630), and the first sub-block model may be generated based on the first logical information and the changed first physical information (step S640).

The row information for a space in which a standard cell is disposed and the routing track information for an arrangement of metal wires may be represented differently on different workstations (e.g., on different EDA tools). As described above, the first sub-block model and the second sub-block model may be models suitable for the second workstation in the example of FIG. 9, and thus the row information and/or the routing track information, which are generated by the first workstation and included in the first physical information associated with the result of designing the first sub-block, may be changed to be suitable for the second workstation (e.g., to be readable and processable by the second workstation).

In some example embodiments, the first logical information may include a netlist, and the first physical information may include a design exchange format (DEF). However, example embodiments are not limited thereto, and the first logical information and the first physical information may further include various other information. For example, the first physical information may include a library exchange format (LEF).

Figure 11:
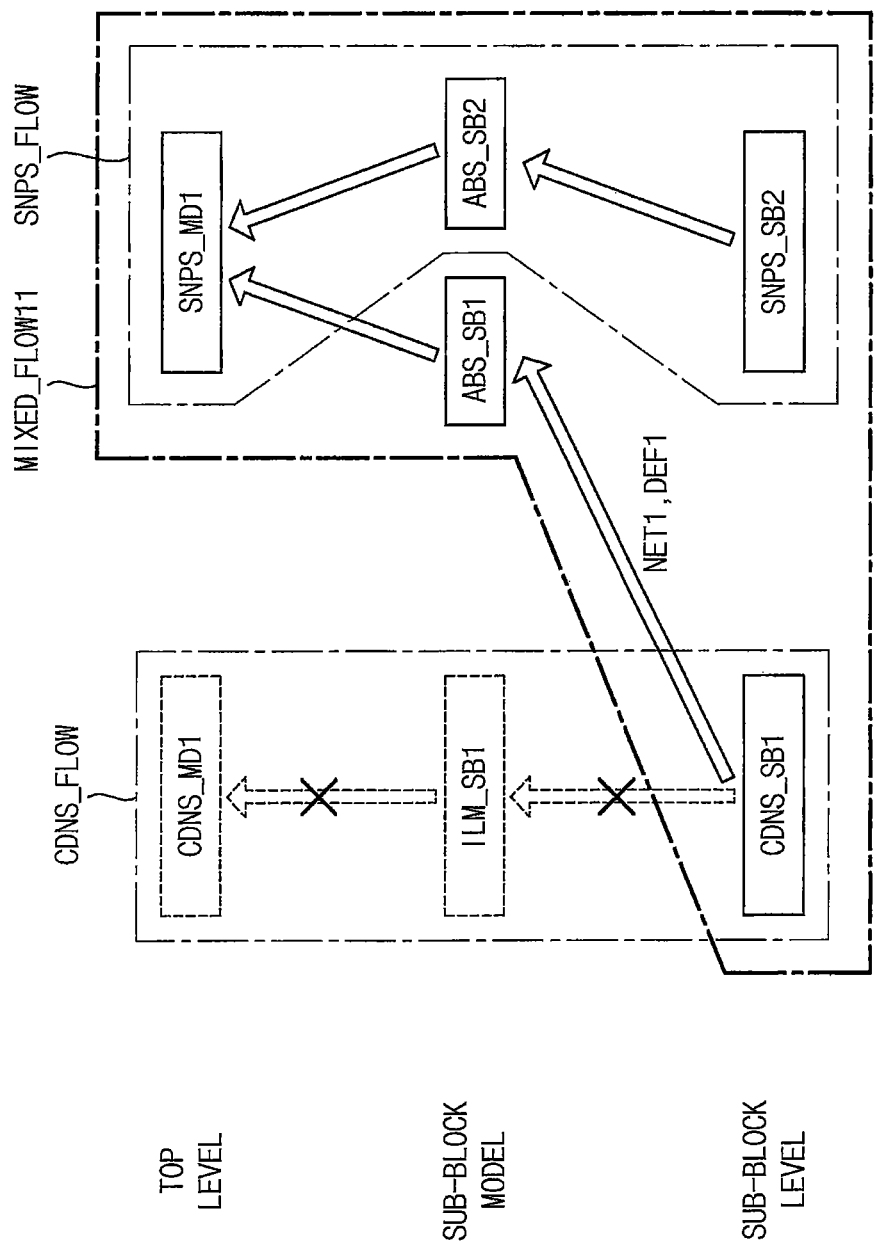
FIG. 11 is a diagram for describing a method of designing a semiconductor device according to example embodiments of the present disclosure.

FIG. 11 is a diagram for describing a method of designing a semiconductor device according to example embodiments of the present disclosure. FIG. 11 illustrates a case where the example of FIG. 9 is performed or executed.

In FIG. 11 and subsequent figures, the term "SUB-BLOCK LEVEL" represents a result of designing each sub-block, the term "TOP LEVEL" represents a result of designing the entire semiconductor device generated by combining designed sub-blocks. In addition, example embodiments are described based on a case where the first workstation is implemented based on the INNOVUS tool and the second workstation is implemented based on the ICC2 tool. However, example embodiments are not limited thereto, and the workstations may be implemented based on various other EDA tools.

Referring to FIGS. 2, 4, 5, and 11, the first workstation 1100 may generate a design result CDNS_SB1 of the first sub-block 110 based on the first input data SB1, and the second workstation 1200 may generate a design result SNPS_SB2 of the second sub-block 120 based on the second input data SB2. In some embodiments, the format of the design result CDNS_SB1 may be different from the format of the design result SNPS_SB2. The second workstation 1200 may transform first logical information NET1 and first physical information DEF1 associated with the design result CDNS_SB1 of the first sub-block 110 to generate a first sub-block model ABS_SB1 suitable for the second workstation 1200. The second workstation 1200 may generate a second sub-block model ABS_SB2 suitable for the second workstation 1200 based on the design result SNPS_SB2 of the second sub-block 120. The third workstation 1300 in FIG. 4 or the second workstation 1200 in FIG. 5 may obtain an integrated physical design SNPS_MD1 for the entire semiconductor device 100 based on the first sub-block model ABS_SB1 and the second sub-block model ABS_SB2.

Unlike a first flow CDNS_FLOW using only the first workstation 1100, and unlike a second flow SNPS FLOW using only the second workstation 1200, a mixed flow MIXED_FLOW11 combining the first flow CDNS_FLOW and the second flow SNPS FLOW may be implemented according to example embodiments. FIG. 11 illustrates the mixed flow MIXED_FLOW11 for obtaining the integrated physical design SNPS_MD1 using the ICC2 tool.

Figure 12:
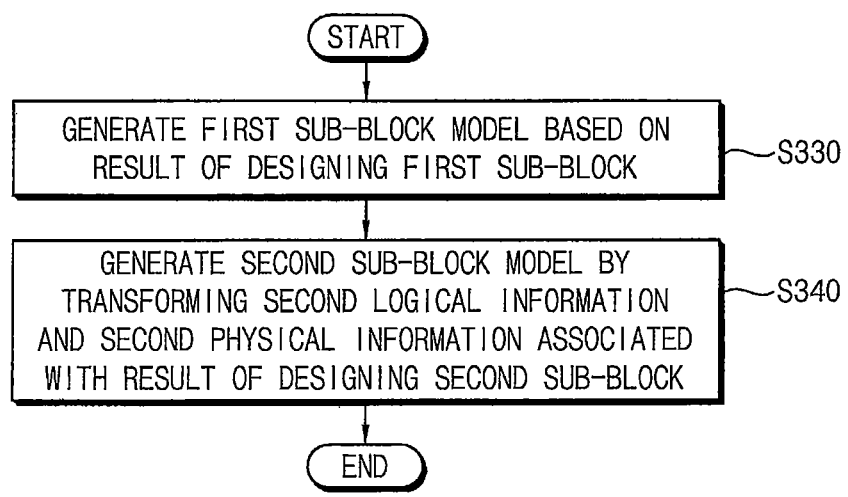
FIG. 12 is a flowchart illustrating another example of generating a first sub-block model and a second sub-block model in FIG. 1.

FIG. 12 is a flowchart illustrating another example of generating a first sub-block model and a second sub-block model in FIG. 1. The descriptions repeated with FIG. 9 will be omitted.

Referring to FIGS. 1 and 12, when generating the first sub-block model and the second sub-block model (step S300), the first sub-block model may be generated based on the result of designing the first sub-block (step S330), and the second sub-block model may be generated by transforming second logical information and second physical information associated with the result of designing the second sub-block (step S340). FIG. 12 illustrates an example where the first sub-block model and the second sub-block model are generated by the first workstation and are suitable for the first workstation.

Step S340 may be similar to step S310 in FIG. 9 and may be performed as described with reference to FIG. 10. For example, the second logical information associated with the result of designing the second sub-block may be loaded, the second physical information associated with the result of designing the second sub-block may be loaded, row information and/or routing track information included in the second physical information may be changed, and the second sub-block model may be generated based on the second logical information and the changed second physical information. The row information and/or the routing track information, which are generated by the second workstation and included in the second physical information associated with the result of designing the second sub-block, may be changed to be suitable for (e.g., compatible with) the first workstation.

Figure 13:
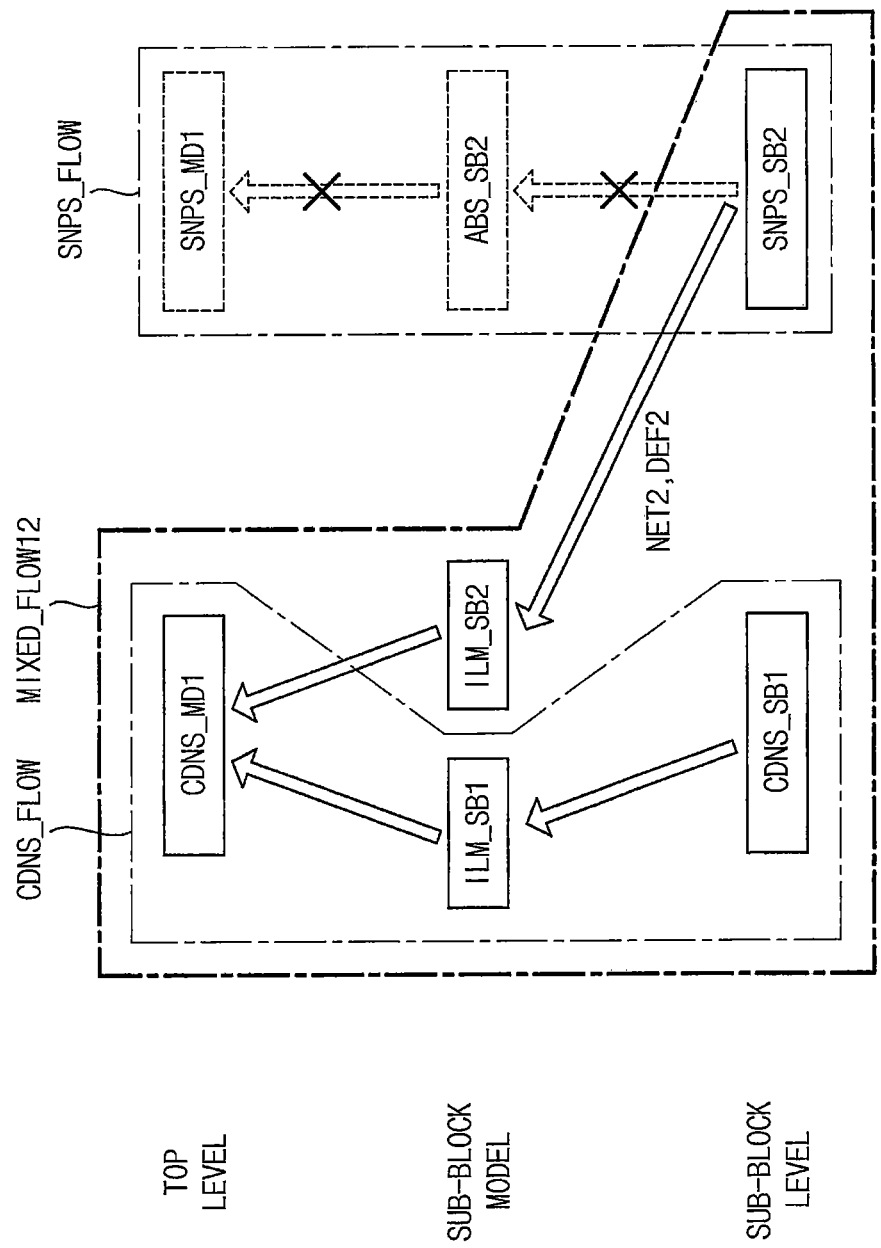
FIG. 13 is a diagram for describing a method of designing a semiconductor device according to example embodiments of the present disclosure.

FIG. 13 is a diagram for describing a method of designing a semiconductor device according to example embodiments of the present disclosure. FIG. 13 illustrates a case where the example of FIG. 12 is performed or executed. The descriptions repeated with FIG. 11 will be omitted.

Referring to FIGS. 2, 4, 5, and 13, the first workstation 1100 may generate a first sub-block model ILM_SB1 suitable for the first workstation 1100 based on the design result CDNS_SB1 of the first sub-block 110. The first workstation 1100 may transform second logical information NET2 and second physical information DEF2 associated with the design result SNPS_SB2 of the second sub-block 120 to generate a second sub-block model ILM_SB2 suitable for the first workstation 1100. The third workstation 1300 in FIG. 4 or the first workstation 1100 in FIG. 5 may obtain an integrated physical design CDNS_MD1 for the entire semiconductor device 100 based on the first sub-block model ILM_SB1 and the second sub-block model ILM_SB2. FIG. 13 illustrates a mixed flow MIXED_FLOW12 for obtaining the integrated physical design CDNS_MD1 using the INNOVUS tool.

Figure 14:
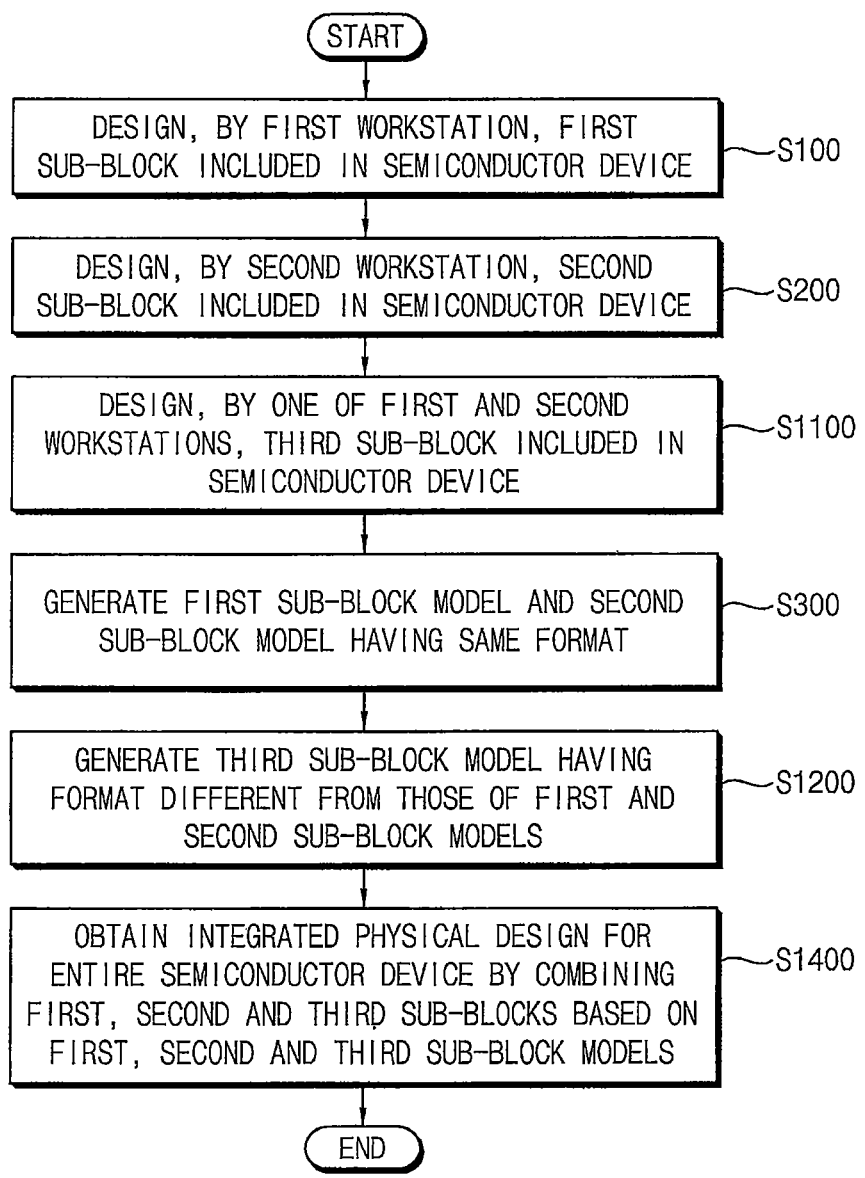
FIG. 14 is a flowchart illustrating a method of designing a semiconductor device according to example embodiments of the present disclosure.
Figure 15:
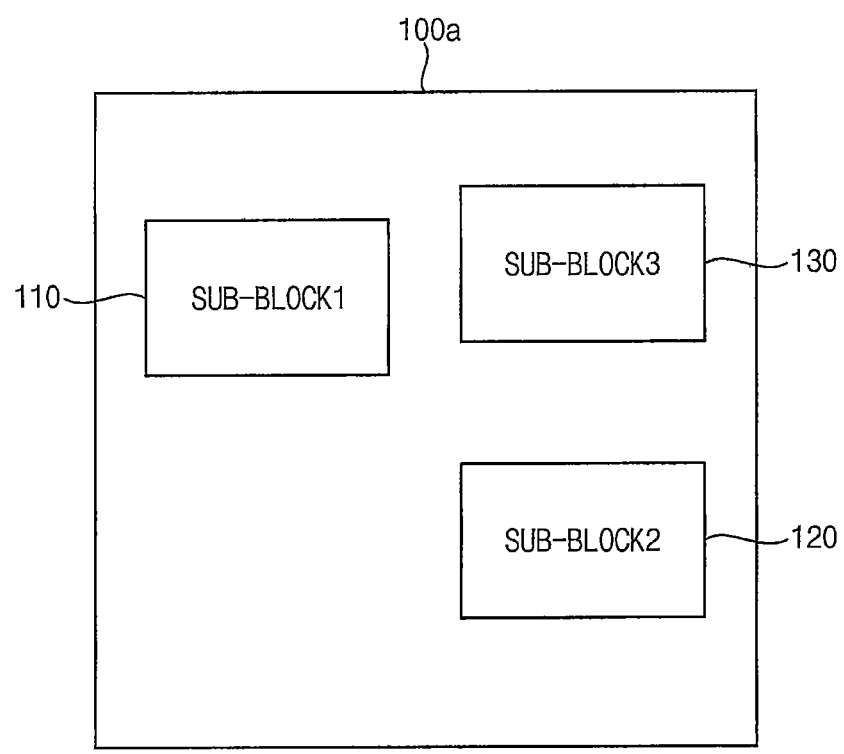
FIG. 15 is a diagram for describing a method of designing a semiconductor device according to example embodiments of the present disclosure.

FIG. 14 is a flowchart illustrating a method of designing a semiconductor device according to example embodiments of the present disclosure. FIG. 15 is a diagram for describing a method of designing a semiconductor device according to example embodiments of the present disclosure. The descriptions repeated with FIGS. 1 and 2 will be omitted.

Referring to FIGS. 14 and 15, in a method of designing a semiconductor device according to example embodiments, steps S100, S200, and S300 may be substantially the same as steps S100, S200, and S300 in FIG. 1, respectively.

A third sub-block included in the semiconductor device is designed by the first workstation or the second workstation (step S1100). For example, one of the first workstation or the second workstation may receive third input data for the third sub-block to perform step S1100. Step S1100 may be substantially the same as step S100 and/or step S200.

As illustrated in FIG. 15, a semiconductor device 100a includes a first sub-block 110, a second sub-block 120, and a third sub-block 130 that are different from each other. The semiconductor device 100a may be designed by dividing the semiconductor device 100a into a plurality of sub-blocks 110, 120, and 130, by designing each of the sub-blocks 110, 120, and 130, and by integrating the designed sub-blocks 110, 120, and 130. Although FIG. 15 illustrates three sub-blocks 110, 120, and 130 for convenience of illustration, example embodiments of the present disclosure are not limited thereto, and the number of sub-blocks included in the semiconductor device 100a may be changed according to example embodiments.

A third sub-block model corresponding to the third sub-block 130 may be generated by transforming logical information and physical information associated with a result of designing the third sub-block (step S1200). The third sub-block model has a format different from those of the first sub-block model and the second sub-block model. An integrated physical design for the entire semiconductor device 100a may be obtained by combining the first sub-block 110, the second sub-block 120, and the third sub-block 130 based on the first sub-block model, the second sub-block model, and the third sub-block model (step S1400). Steps S1200 and S1400 may be substantially the same as steps S300 and S400 in FIG. 1, respectively.

In some example embodiments, unlike the first sub-block model that includes both physical information and timing information of the first sub-block 110, and unlike the second sub-block model that includes both physical information and timing information of the second sub-block 120, the third sub-block model may include only timing information of the third sub-block 130 and may not include physical information of the third sub-block 130.

Figure 16:
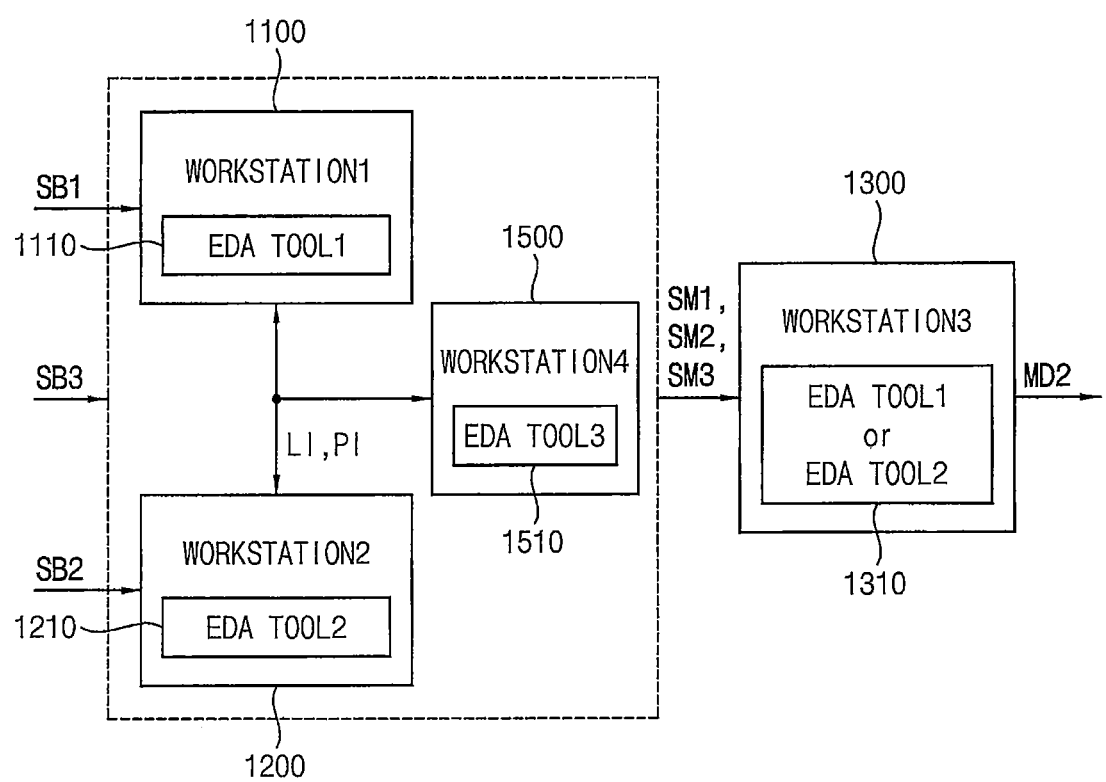
FIGS. 16 and 17 are block diagrams illustrating a design system for a semiconductor device according to example embodiments of the present disclosure.
Figure 17:
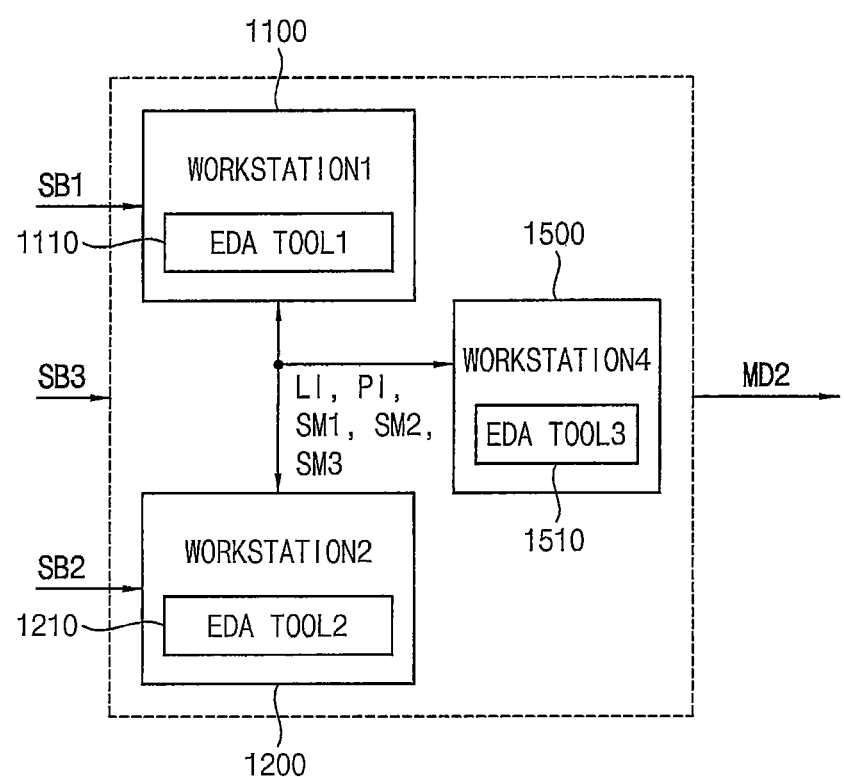

FIGS. 16 and 17 are block diagrams illustrating a design system 1002 for a semiconductor device according to example embodiments of the present disclosure. The descriptions repeated with FIGS. 4 and 5 will be omitted.

Referring to FIGS. 15 and 16, a design system 1002 includes a first workstation 1100, a second workstation 1200, a third workstation 1300, and a fourth workstation 1500.

The design system 1002 may be substantially the same as the design system 1000 of FIG. 4, except that the design system 1002 further includes the fourth workstation 1500 and an operation of the design system 1002 is partially changed.

The first workstation 1100 or the second workstation 1200 receives third input data SB3 for the third sub-block 130 included in the semiconductor device 100a and designs the third sub-block 130 based on the third input data SB3. In other words, one of the first workstation 1100 or the second workstation 1200 may perform step S1100 in FIG. 14. The first workstation 1100 or the second workstation 1200 provides logical information and physical information associated with a result of designing the third sub-block 130 to the fourth workstation 1500.

The fourth workstation 1500 is different from the first workstation 1100, the second workstation 1200, and the third workstation 1300, transforms the logical information and the physical information associated with the result of designing the third sub-block 130, and generates a third sub-block model SM3 that has a format different from those of the first sub-block model SM1 and the second sub-block model SM2. In other words, the fourth workstation 1500 may perform step S1200 in FIG. 14. The third sub-block model SM3 may correspond to the third sub-block 130. The fourth workstation 1500 may include a third EDA tool 1510 for designing the third sub-block 130. The third EDA tool 1510 may be a different type of tool from the first EDA tool 1110 and the second EDA tool 1210.

In some example embodiments, the third EDA tool 1510 may be a PRIMETIME tool from Synopsys, Inc., and a sub-block model generated by the third EDA tool 1510 may be an extracted timing model (ETM). The ETM may not include physical information, may include only timing information, and thus may have an advantage in that it can be used on both the INNOVUS tool and the ICC2 tool. However, example embodiments are not limited thereto, and the third EDA tool 1510 may be one of various other EDA tools different from the first EDA tool 1110 and the second EDA tool 1210.

The third workstation 1300 combines the first sub-block 110, the second sub-block 120, and the third sub-block 130 based on the first sub-block model SM1, the second sub-block model SM2, and the third sub-block model SM3, and obtains an integrated physical design MD2 for the entire semiconductor device 100a. In other words, the third workstation 1300 may perform step S1400 in FIG. 14.

Referring to FIGS. 15 and 17, a design system 1002a includes a first workstation 1100, a second workstation 1200, and a fourth workstation 1500.

The design system 1002a may be substantially the same as the design system 1000a of FIG. 5, except that the design system 1002a further includes the fourth workstation 1500 and an operation of the design system 1002a is partially changed. The fourth workstation 1500 may be substantially the same as the fourth workstation 1500 in FIG. 16.

FIGS. 18A, 18B, 19A, and 19B are diagrams for describing a method of designing a semiconductor device according to example embodiments of the present disclosure. The descriptions repeated with FIGS. 11 and 13 will be omitted.

Figure 18A:
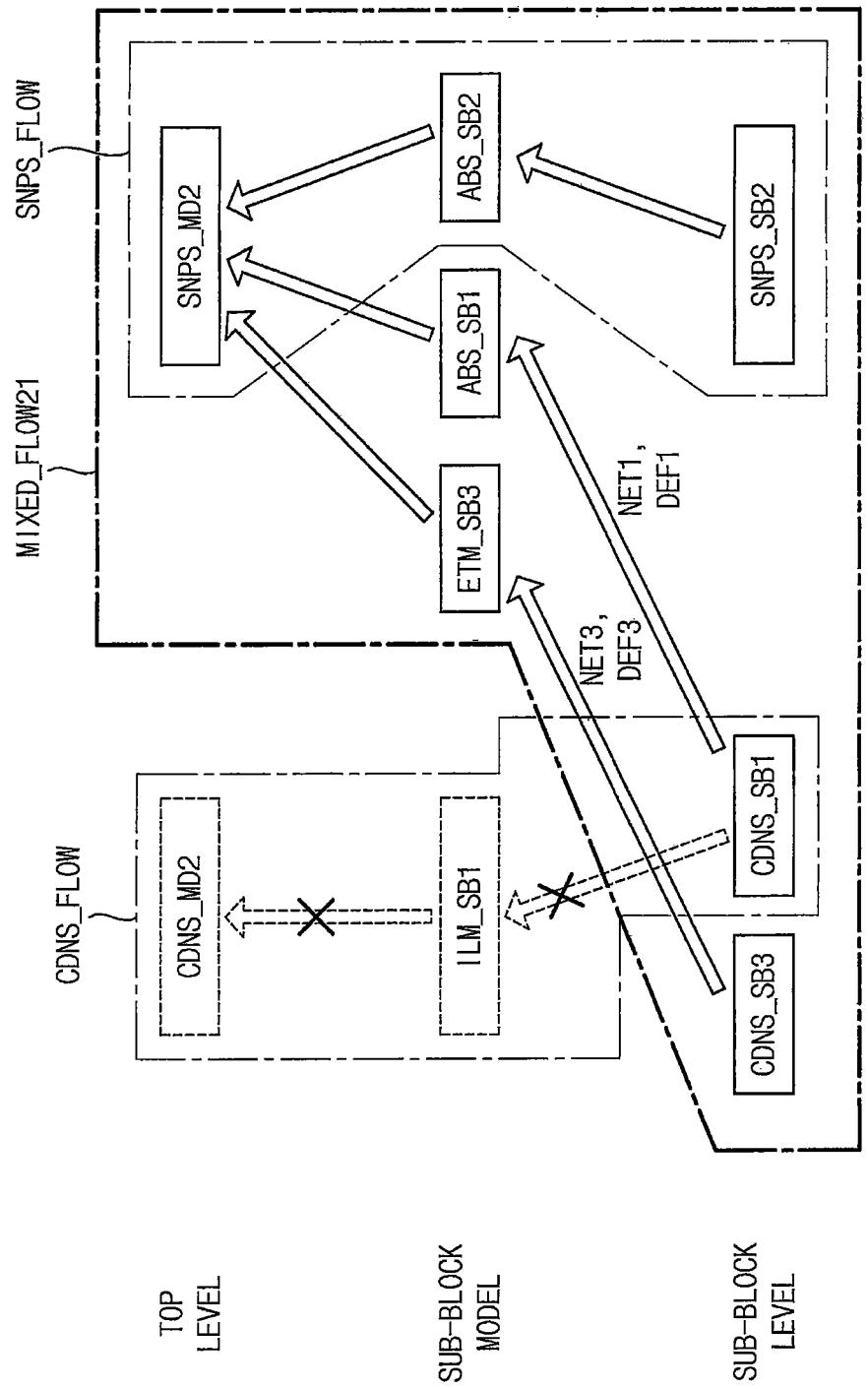
FIGS. 18A, 18B, 19A, and 19B are diagrams for describing a method of designing a semiconductor device according to example embodiments of the present disclosure.

In FIG. 18A and subsequent figures, example embodiments are described based on a case where the fourth workstation is implemented based on the PRIMETIME tool. However, example embodiments are not limited thereto, and the workstations may be implemented based on various other EDA tools.

Referring to FIGS. 15, 16, 17, and 18A, in a mixed flow MIXED_FLOW21, the descriptions repeated with the mixed flow MIXED_FLOW11 in FIG. 11 will be omitted.

The first workstation 1100 may generate a design result CDNS_SB3 of the third sub-block 130 based on the third input data SB3. The fourth workstation 1500 may transform third logical information NET3 and the third physical information DEF3 associated with the design result CDNS_SB3 of the third sub-block 130 to generate a third sub-block model ETM_SB3 usable in or suitable for both the first workstation 1100 and the second workstation 1200. The third workstation 1300 in FIG. 15 or the second workstation 1200 in FIG. 16 may obtain an integrated physical design SNPS_MD2 for the entire semiconductor device 100a based on the first sub-block model ABS_SB1, the second sub-block model ABS_SB2, and the third sub-block model ETM_SB3.

Referring to FIGS. 15, 16, 17, and 18B, in a mixed flow MIXED_FLOW22, the descriptions repeated with the mixed flow MIXED_FLOW11 in FIG. 11 and the mixed flow MIXED_FLOW21 in FIG. 18A will be omitted.

The second workstation 1200 may generate a design result SNPS_SB3 of the third sub-block 130 based on the third input data SB3. The fourth workstation 1500 may transform third logical information NET3 and third physical information DEF3 associated with the design result SNPS_SB3 of the third sub-block 130 to generate a third sub-block model ETM_SB3 usable in both the first workstation 1100 and the second workstation 1200.

Figure 18B:
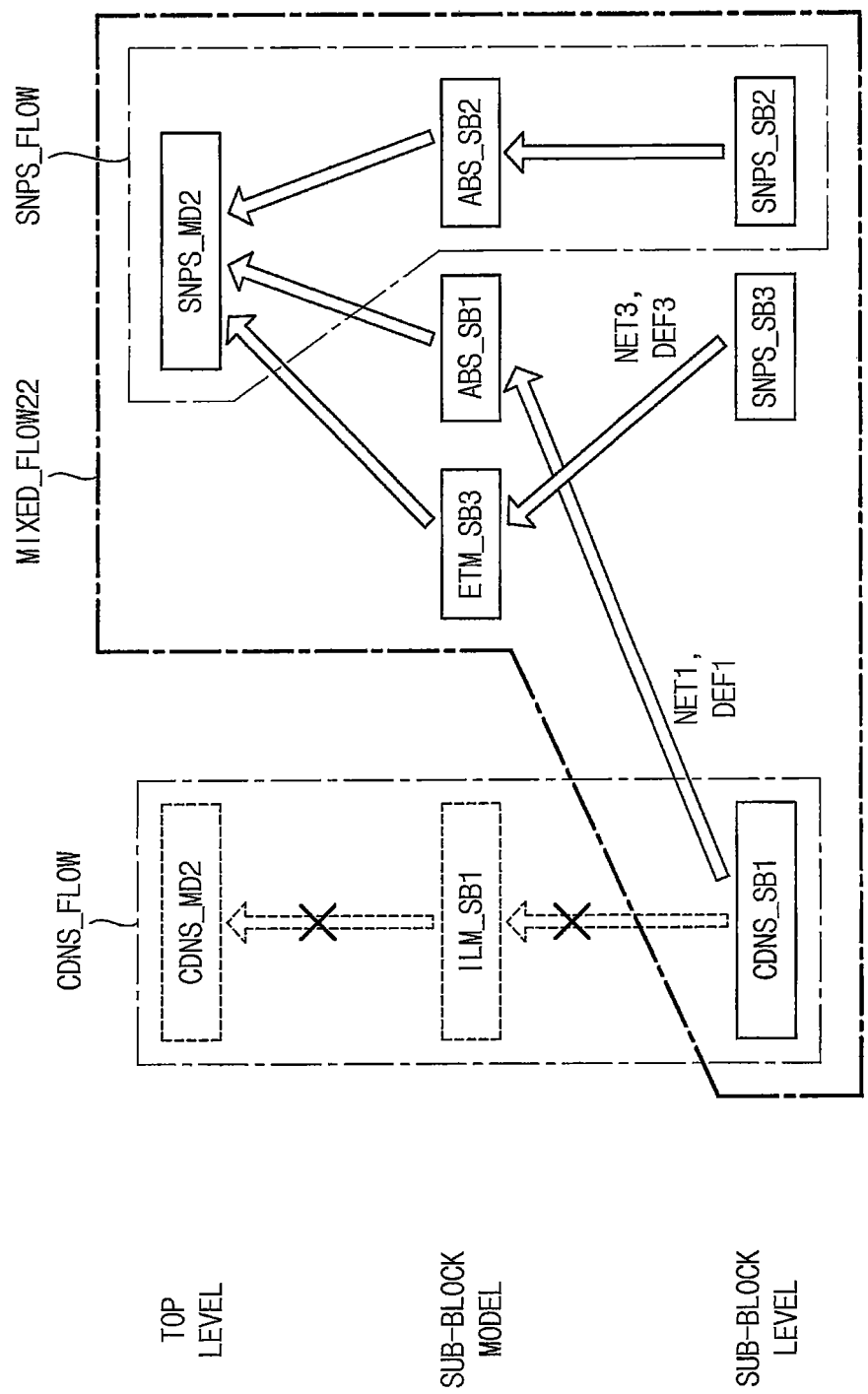

FIGS. 18A and 18B illustrate examples where the integrated physical design SNPS_MD2 is obtained using the ICC2 tool.

Referring to FIGS. 15, 16, 17, and 19A, in a mixed flow MIXED_FLOW23, the descriptions repeated with the mixed flow MIXED_FLOW12 in FIG. 13 will be omitted.

The first workstation 1100 may generate a design result CDNS_SB3 of the third sub-block 130 based on the third input data SB3. The fourth workstation 1500 may transform third logical information NET3 and the third physical information DEF3 associated with the design result CDNS_SB3 of the third sub-block 130 to generate a third sub-block model ETM_SB3 usable in or suitable for both the first workstation 1100 and the second workstation 1200. The third workstation 1300 in FIG. 15 or the first workstation 1100 in FIG. 16 may obtain an integrated physical design CDNS_MD2 for the entire semiconductor device 100a based on the first sub-block model ILM_SB1, the second sub-block model ILM_SB2, and the third sub-block model ETM_SB3.

Figure 19A:
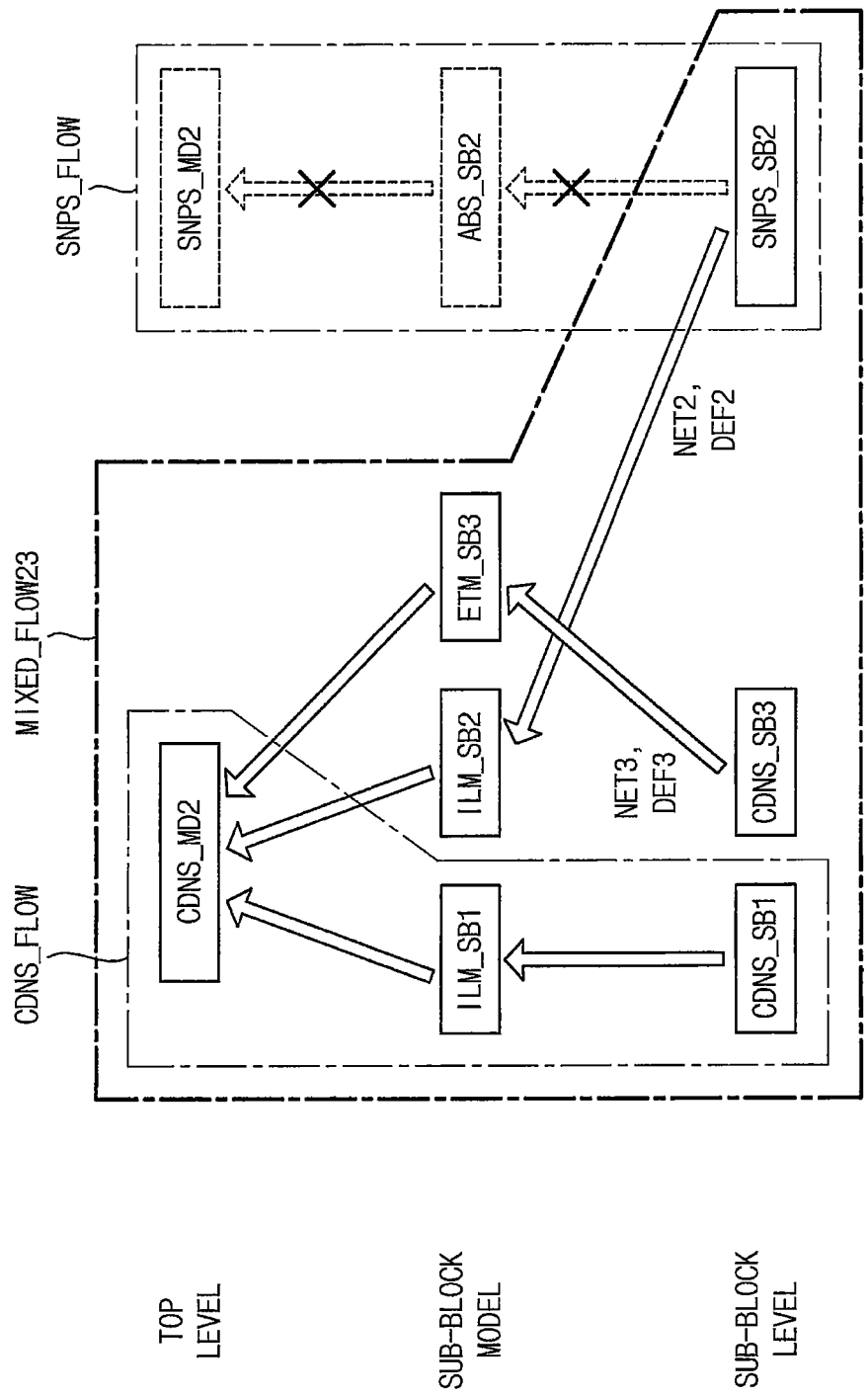

Referring to FIGS. 15, 16, 17, and 19B, in a mixed flow MIXED_FLOW24, the descriptions repeated with the mixed flow MIXED_FLOW12 in FIG. 13 and the mixed flow MIXED_FLOW23 in FIG. 19A will be omitted.

The second workstation 1200 may generate a design result SNPS_SB3 of the third sub-block 130 based on the third input data SB3. The fourth workstation 1500 may transform third logical information NET3 and third physical information DEF3 associated with the design result SNPS_SB3 of the third sub-block 130 to generate a third sub-block model ETM_SB3 usable in both the first workstation 1100 and the second workstation 1200.

Figure 19B:
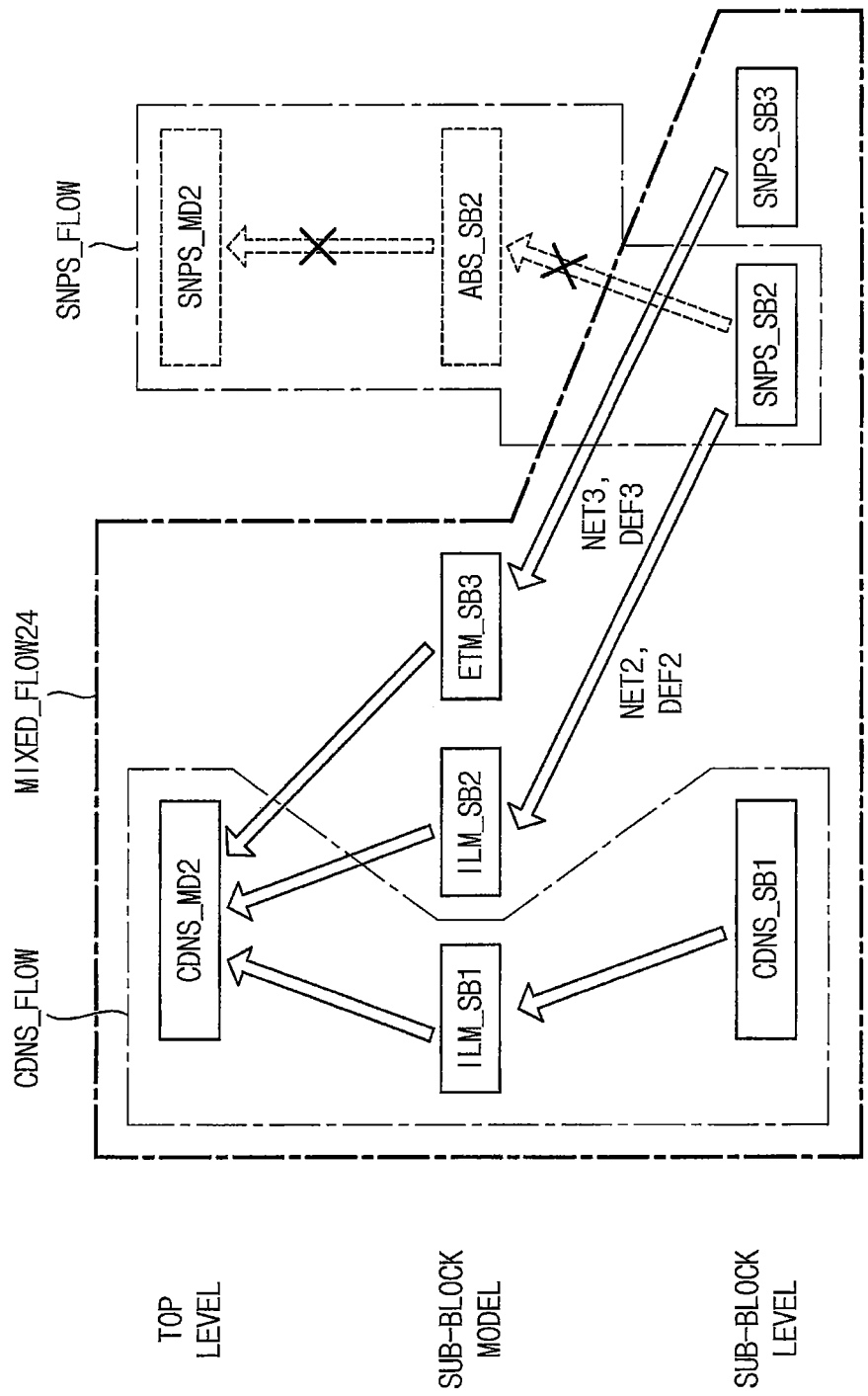

FIGS. 19A and 19B illustrate examples where the integrated physical design CDNS_MD2 is obtained using the INNOVUS tool.

Although example embodiments are described based on the specific number of sub-blocks and the specific number and type of workstations (e.g. EDA tools), example embodiments are not limited thereto, and example embodiments may be applied or employed to various mixed flows where a single semiconductor device is designed by separately designing any number of sub-blocks included in the single semiconductor device using different workstations and by transforming and combining the design results using a single workstation.

Figure 20:
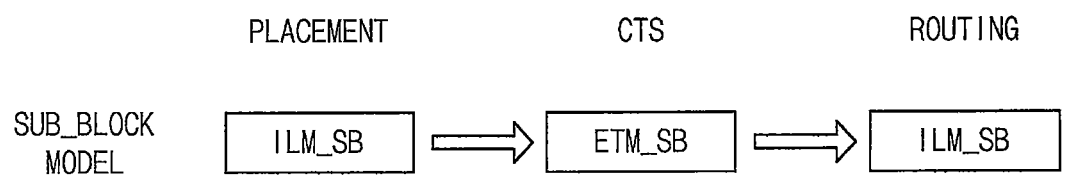
FIG. 20 is a diagram for describing a method of designing a semiconductor device according to example embodiments of the present disclosure.

FIG. 20 is a diagram for describing a method of designing a semiconductor device according to example embodiments of the present disclosure.

Referring to FIG. 20, example embodiments may be applied or employed to not only examples where sub-block models are transformed after designs for all sub-blocks are completed but also examples where a sub-block model is transformed during a process of designing one sub-block.

For example, as described with reference to FIG. 7, the process of designing one sub-block may include the placement, the CTS and the routing. The placement may be performed based on a sub-block model ILM_SB of a first format (e.g., a first sub-block model format) for a sub-block. The sub-block model ILM_SB of the first format may be transformed to a sub-block model ETM_SB of a second format (e.g., a second sub-block model format) for the sub-block, and then the CTS may be performed based on the sub-block model ETM_SB of the second format. The second format may be different from the first format. The sub-block model of the second format ETM_SB may be transformed back to the sub-block model of the first format ILM_SB, and then the routing may be performed based on the sub-block model ILM_SB of the first format.

Figure 21:
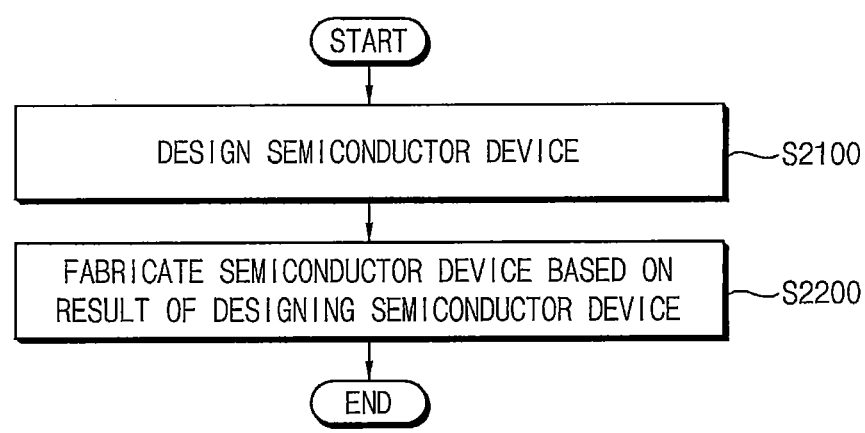
FIG. 21 is a flowchart illustrating a method of manufacturing a semiconductor device according to example embodiments of the present disclosure.

FIG. 21 is a flowchart illustrating a method of manufacturing a semiconductor device according to example embodiments of the present disclosure.

Referring to FIG. 21, in a method of manufacturing a semiconductor device according to example embodiments, the semiconductor device is designed (step S2100), and the semiconductor device is fabricated based on a result of designing the semiconductor device (step S2200). The designing operation in step S2100 may be performed based on the method of designing the semiconductor device according to example embodiments described with reference to FIGS. 1 through 20.

As will be appreciated by those skilled in the art, the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

The inventive concepts may be applied to various devices and/or systems including the semiconductor devices. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments of the present disclosure and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of designing a semiconductor device, the method comprising:
    designing, by a first electronic design automation (EDA) tool comprising a first computer program, a first sub-block included in the semiconductor device;
    designing, by a second EDA tool different from the first EDA tool and comprising a second computer program that is different from the first computer program, a second sub-block included in the semiconductor device, wherein the first EDA tool and the second EDA tool are configured to design different physical structures from a same logical block;
    generating a first sub-block model corresponding to the first sub-block and a second sub-block model corresponding to the second sub-block by transforming logical information and physical information associated with one of a result of designing the first sub-block by the first EDA tool or a result of designing the second sub-block by the second EDA tool such that the first sub-block model and the second sub-block model are both compatible with the first EDA tool or the second EDA tool; and
    obtaining an integrated physical design for the semiconductor device by combining the first sub-block and the second sub-block based on the first sub-block model and the second sub-block model.

2. The method of claim 1, wherein generating the first sub-block model and the second sub-block model comprises:
    generating the first sub-block model by transforming first logical information and first physical information associated with the result of designing the first sub-block; and
    generating the second sub-block model based on the result of designing the second sub-block.

3. The method of claim 2, wherein generating the first sub-block model includes:
    loading the first logical information;
    loading the first physical information;
    generating changed first physical information by changing row information and/or routing track information included in the first physical information; and
    generating the first sub-block model based on the first logical information and the changed first physical information.

4. The method of claim 3, wherein:
    the first sub-block model and the second sub-block model are models compatible with the second EDA tool, and
    the row information and/or the routing track information included in the first physical information is changed to be suitable for the second EDA tool.

5. The method of claim 2, wherein:
    the first logical information comprises a netlist, and
    the first physical information comprises a design exchange format (DEF).

6. The method of claim 1, wherein generating the first sub-block model and the second sub-block model comprises:

generating the first sub-block model based on the result of designing the first sub-block; and
generating the second sub-block model by transforming second logical information and second physical information associated with the result of designing the second sub-block.

7. The method of claim 6, wherein:
the first sub-block model and the second sub-block model are compatible with the first EDA tool, and
the second physical information is changed to be compatible with the first EDA tool.

8. The method of claim 1, further comprising:
designing, by first EDA tool and/or the second EDA tool, a third sub-block included in the semiconductor device; and
generating a third sub-block model corresponding to the third sub-block by transforming logical information and physical information associated with a result of designing the third sub-block, the third sub-block model having a format different from the first sub-block model and the second sub-block model,
wherein the integrated physical design for the semiconductor device is obtained by combining the first sub-block, the second sub-block, and the third sub-block based on the first sub-block model, the second sub-block model, and the third sub-block model.

9. The method of claim 8, wherein the third sub-block model comprises timing information of the third sub-block and does not include physical information of the third sub-block.

10. The method of claim 1, wherein designing the first sub-block comprises:
performing a floor plan;
performing a power plan;
performing a placement on elements included in the first sub-block;
performing a clock tree synthesis (CTS) on a clock signal provided to the elements;
performing a routing on a normal signal provided to the elements; and
verifying a result of the placement and a result of the routing.

11. The method of claim 10, wherein a first sub-block model format is used for performing the placement and for performing the routing of the first sub-block,
wherein a second sub-block model format is used for performing the CTS of the first sub-block, and
wherein the second sub-block model format is different from the first sub-block model format.

12. The method of claim 1, wherein:
the first EDA tool is executed by a first workstation, and
the second EDA tool is executed by a second workstation different from the first workstation.

13. A design system comprising:
a first electronic design automation (EDA) tool comprising a first computer program that is configured to design a first sub-block included in a semiconductor device; and
a second EDA tool comprising a second computer program that is configured to design a second sub-block included in the semiconductor device, the second EDA tool being different from the first EDA tool,
wherein the first EDA tool and the second EDA tool are further configured to design different physical structures from a same logical block,
wherein the second EDA tool is further configured to generate a second sub-block model corresponding to the second sub-block and to generate a first sub-block model by transforming first logical information and first physical information associated with a result of designing the first sub-block to be compatible with the second EDA tool,
wherein the first sub-block model and the second sub-block model are compatible with the second EDA tool, and
wherein an integrated physical design for the semiconductor device is obtained by combining the first sub-block and the second sub-block based on the first sub-block model and the second sub-block model.

14. The design system of claim 13, wherein the second EDA tool is further configured to obtain the integrated physical design for the semiconductor device.

15. The design system of claim 13, further comprising:
a third EDA tool configured to obtain the integrated physical design for the semiconductor device by combining the first sub-block and the second sub-block based on the first sub-block model and the second sub-block model.

16. The design system of claim 15, wherein the second EDA tool and the third EDA tool are further configured to design a same physical structure for the same logical block.

17. A method of designing a semiconductor device, the method comprising:
designing a first sub-block included in the semiconductor device using a first design scheme;
designing a second sub-block included in the semiconductor device using a second design scheme that is different from the first design scheme, wherein the first design scheme and the second design scheme are configured to design different physical structures from a same logical block;
generating a first sub-block model corresponding to the first sub-block and a second sub-block model corresponding to the second sub-block by transforming logical information and physical information associated with one of a result of designing the first sub-block using the first design scheme or a result of designing the second sub-block using the second design scheme such that the first sub-block model and the second sub-block model are both compatible with the first design scheme or the second design scheme; and
obtaining an integrated physical design for the semiconductor device by combining the first sub-block and the second sub-block based on the first sub-block model and the second sub-block model.

18. The method of claim 17, wherein generating the first sub-block model and the second sub-block model comprises:
generating the first sub-block model by transforming first logical information and first physical information associated with a result of designing the first sub-block; and
generating the second sub-block model based on a result of designing the second sub-block.

19. The method of claim 17, wherein designing the first sub-block comprises:
performing a floor plan;
performing a power plan;
performing a placement on elements included in the first sub-block;
performing a clock tree synthesis (CTS) on a clock signal provided to the elements;
performing a routing on a normal signal provided to the elements; and verifying a result of the placement and a result of the routing.

20. The method of claim 17, wherein:
the first design scheme is executed by a first workstation, and
the second design scheme is executed by a second workstation different from the first workstation.

* * * * *